(12) United States Patent
Ramasamy et al.

(10) Patent No.: US 11,601,186 B1
(45) Date of Patent: Mar. 7, 2023

(54) SYSTEM AND METHOD FOR DYNAMIC PAIRING OF A HOST AND OUT-OF-BAND RADIO USING RADIO AND EMBEDDED CONTROLLER CONTEXTUAL TELEMETRY

(71) Applicant: Dell Products, LP, Round Rock, TX (US)

(72) Inventors: Suresh K. Ramasamy, Cedar Park, TX (US); Abeye Teshome, Austin, TX (US); Liam B. Quinn, Austin, TX (US); Julius Mueller, Santa Cruz, CA (US)

(73) Assignee: Dell Products, LP, Round Rock, TX (US)

( * ) Notice: Subject to any disclaimer, the term of this patent is extended or adjusted under 35 U.S.C. 154(b) by 1 day.

(21) Appl. No.: 17/500,850

(22) Filed: Oct. 13, 2021

(51) Int. Cl.
*H04B 7/08* (2006.01)
*H04W 88/06* (2009.01)
*H04W 84/12* (2009.01)

(52) U.S. Cl.
CPC .......... *H04B 7/0808* (2013.01); *H04W 88/06* (2013.01); *H04W 84/12* (2013.01)

(58) Field of Classification Search
CPC ..... H04B 7/0808; H04W 88/06; H04W 84/12
See application file for complete search history.

(56) References Cited

U.S. PATENT DOCUMENTS

| | | | |
|---|---|---|---|
| 2008/0272880 A1* | 11/2008 | Sutardja | G06Q 20/355 340/5.2 |
| 2010/0048196 A1* | 2/2010 | Georgantas | H04B 1/109 455/422.1 |
| 2012/0094666 A1* | 4/2012 | Awoniyi | H04W 36/0058 455/435.1 |

* cited by examiner

*Primary Examiner* — Sung S Ahn
(74) *Attorney, Agent, or Firm* — Prol Intellectual Property Law, PLLC; H. Kenneth Prol

(57) ABSTRACT

An information handling system include a processor; a memory; a power management unit; a wireless interface adapter for transceiving wireless communications via RF waves having a third wireless protocol subsystem operatively and selectively couplable to one of a first antenna and a second antenna via an RF switch to initiate OOB communications with a network; and an antenna controller operatively coupled to the RF switch configured to receive radio telemetry data indicating radio connection status information of the first wireless protocol subsystem, the second wireless protocol subsystem, and the third wireless protocol subsystem; and determine assignment of one of the first antenna and second antenna to be a shared antenna and switched to the third wireless protocol subsystem based on the operational status of the first wireless protocol subsystem, second wireless protocol subsystem, and third wireless protocol subsystem.

20 Claims, 6 Drawing Sheets

SYSTEM AND METHOD FOR DYNAMIC PAIRING OF A HOST AND OUT-OF-BAND RADIO USING RADIO AND EMBEDDED CONTROLLER CONTEXTUAL TELEMETRY

FIELD OF THE DISCLOSURE

The present disclosure generally relates to information handling systems, and more particularly relates to an information handling system including plural antenna systems co-located on a multi-radio information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include transceiving antennas for communication of wireless wide area network (WWAN) (e.g., cellular), wireless local area network (WLAN) (e.g., Wi-Fi), global positioning system (GPS), and Bluetooth signals among others.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
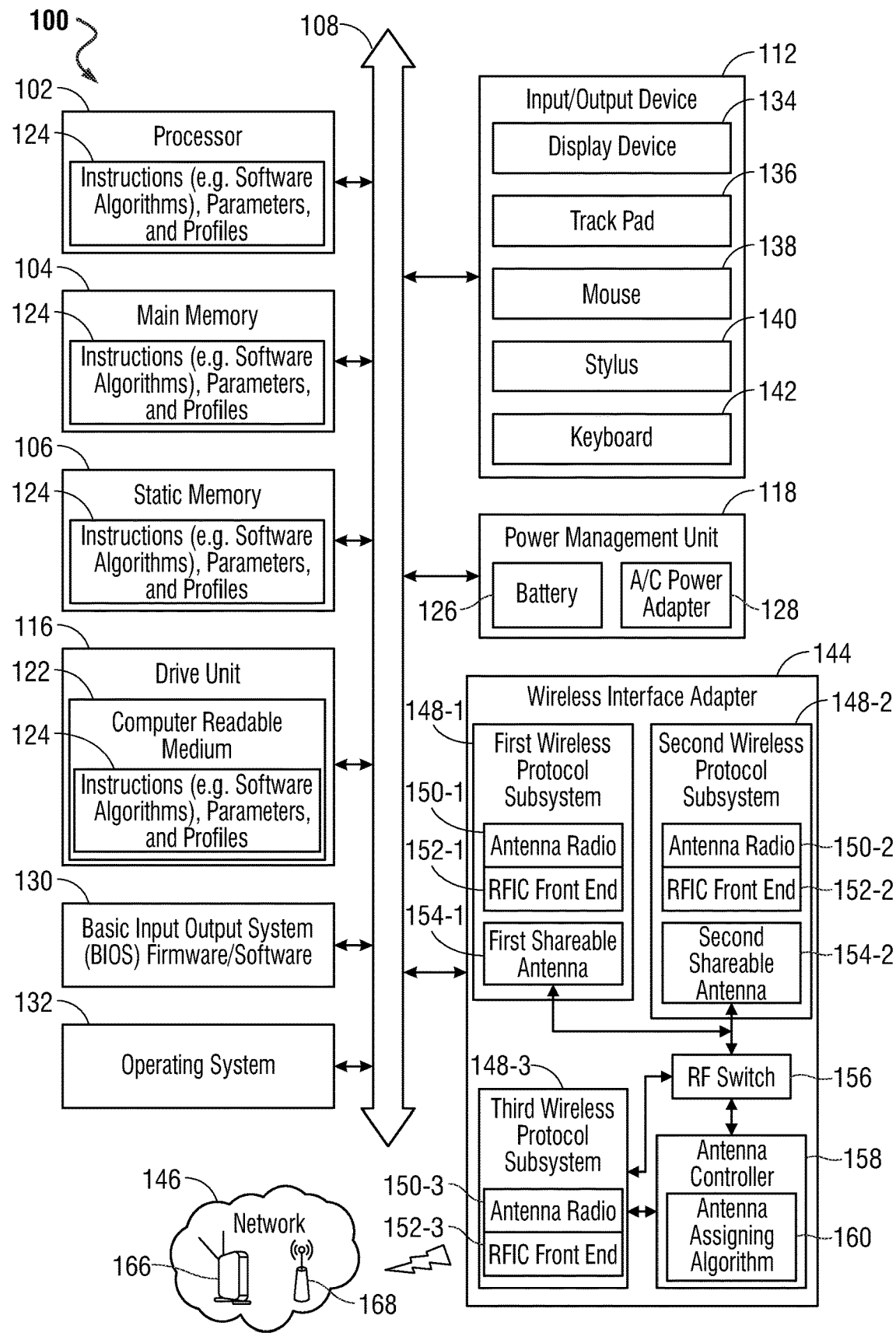
FIG. 1 illustrates an embodiment of information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

For aesthetic, strength, and performance reasons, information handling systems are formed into lighter, thinner, and more streamlined devices, with the use of full metal portions for the outer covers of the display and base housing for strength as well as for those aesthetic reasons. At the same time, the demands for wireless operation also increase. This includes addition of many simultaneously operating radiofrequency (RF) systems, addition of more antennas, and utilization of various antenna types. Space available within the display and base housing, in view of the metal structures used, is less available and more difficult to accommodate in information handling systems. This is particularly true with the expanding number of antennas and antenna systems used in wireless communications for information handling systems. In the present specification and in the appended claims, the term "radio frequency" is meant to be understood as the oscillation rate of an electromagnetic wave. A specific frequency of an electromagnetic wave may have a wavelength that is equal to the speed of light (~300,000 km/s) divided by the frequency.

New types of networks being developed such as 5G networks as well as additional networks accessible using WLAN and Bluetooth radios by both the operating system (OS) 132 of the information handling system 100 and via an out-of-band (OOB) communication link. With these new types of networks, additional antennas that operate on frequencies related to those 5G networks (i.e., high frequency (HF) band, very high frequency (VHF) band, ultra-high frequency (UHF) band, L band, S band, C band, X band, Ku band, K band, Ka band, V band, W band, and millimeter wave bands) are being used. So as to communicate with the existing networks as well as the newly developed networks and multiple platform radios in and OOB, additional antennas may be added to an information handling system. However, the thinner and more streamlined devices have fewer locations and area available for mounting RF transmitters on these mobile information handling systems. As the available locations within the information handling system to house these additional antennas decreases, the need to communication on a growing variety of RF channels and bands is also increasing.

Some information handling systems would address these competing needs by providing for antennas for each of the RF transmitters/receivers of wireless subsystems for various wireless protocols used. The number of antennas becomes increasingly crowded in design and placement on the chassis. However, not all antennas or all protocols may be used simultaneously in many circumstances. Often, the wireless subsystems are present as available alternatives in various locations or with available wireless access points. Additionally, some antennas may be used as additional bandwidth for multiple input, multiple output (MIMO) or aggregated wireless communications which may not be necessary if other wireless systems are available. With multiple antennas that may operate in similar radio frequency ranges for differing wireless protocols, sharing of antenna systems is possible between wireless protocols thus reducing the number of antennas needed to be formed within the display chassis and base chassis of the information handling system. A control system of the present embodiments may be established with an antenna controller and one or more radio frequency (RF) switches to switch one or more antennas associated with one wireless protocol subsystem to another.

Further, WWAN provisioning in an information handling system currently includes operating system (OS) dependency and must interface with a local profile assistant (LPA) agent software (SW) to be able to land profiles from a carrier subscription manager data preparation (SM-DP) server, for example, to an embedded universal integrated circuit card (eUICC) device inside the WWAN modem or the information handling system. In some embodiments, a client device may support multiple OSs. However, frictionless provisioning of profile may be challenged by architecture complexity and multiple agents or services that are required to be integrated and sustained at the information handling system or in a variety of information handling system versions produced by a manufacturer thereby increasing design overhead. By building an OOB (out of band) network connectivity framework and by having a dedicated OOB Wi-Fi radio managed by an embedded controller within the information handling system, OS agnostic backend support is enabled at the information handling system. Currently having a dedicated OOB Wi-Fi radio, however, requires a dedicated antenna to be added within the information handling system which further increases antenna costs, system integration costs, and further impacts space constraints within the information handling system. Embodiments of the present disclosure may decrease the complexity and cost of creating a chassis for the information handling systems with multiple RF antennas by forming fewer antennas in the display or base chassis while also having a dedicated OOB Wi-Fi radio. The co-location of shared antennas switchable with an antenna controller and antenna control system may thereby decrease the size of the information handling system or reduce space occupied by plural antenna systems.

The transmitting antennas of embodiments of the present disclosure may include one or more antennas or a portion of antennas shared among two or more wireless sub-systems such as a Wi-Fi wireless subsystem and a cellular wireless subsystem. In embodiments of the present disclosure, an antenna controller may control an RF switch operatively coupled to one or more shareable antennas. These shareable antennas may be associated with both a first wireless protocol subsystem and a second wireless protocol subsystem based on detected out-of-band radio connection context (e.g., status information indicating operational status of the wireless protocol subsystems) and system operational context (e.g., signal strength, radio mode of operation, among others). Such a method of control of the antenna elements may include the integration of the antenna controller and an RF switch between the antenna element and either of the wireless protocol subsystems.

In some embodiments, the antenna controller may communicate with a Wi-Fi protocol subsystem and a cellular wireless protocol subsystem via a sideband communication. Here the antenna controller may request and receive radio telemetry data indicating radio connection status information of the cellular wireless protocol subsystem and the Wi-Fi/Bluetooth wireless protocol subsystem. In an embodiment, this radio telemetry data may include the current connection state (e.g., idle, connected, scanning, etc.) as well as frequency channel, frequency band, jitter, signal strength, and radio mode of operation (e.g., N×N MIMO), as well as other host detectible radio telemetry data. The antenna controller may also request and receive status information descriptive of operational status of the wireless protocol subsystems via and embedded controller (EC) of the information handling system 100 managing the OOB Wi-Fi radio using a side band serial interface communication protocol. This may be done to harvest OOB network channel telemetry data from a number of wireless protocol networks. This data may include operating frequencies on the networks available to the information handling system, operating frequency bands of the networks available to the information handling system, network congestion data, network bandwidth, and network data transmission speeds, among others. Based on this operational status of the Wi-Fi protocol subsystem and cellular wireless protocol subsystem as well as the system operational context data, the antenna controller may execute an antenna assigning algorithm to assign or reassign one of the antennas associated with either of the Wi-Fi protocol subsystem or cellular wireless protocol subsystem to the OOB Wi-Fi protocol subsystem, operated by an embedded controller, in order to harvest new or additional OOB network channel telemetry data. This allows the antenna controller to manage the system wireless resources by cross pollinating antennas across radios and avoiding the need to add additional antennas. This method and system are also able to support new radios and enable new wireless capabilities by sharing the antennas using context from all on-board radios, both host and out of band concurrently.

Examples are set forth below with respect to particular aspects of an information handling system including case portions such as for a laptop information handling system including the chassis components designed with a fully metal structure and configurable such that the information handling system may operate with any of several wireless protocol subsystems.

FIG. 1 shows an information handling system 100 capable of administering each of the specific embodiments of the present disclosure. The information handling system 100, in an embodiment, can represent the mobile information handling systems 210, 220, and 230 or servers or systems located anywhere within network 200 described in connection with FIG. 2 herein, including the remote data centers operating virtual machine applications. In an embodiment, the information handling system 100 may represent a mobile information handling system associated with a user or recipient of intended wireless communication. A mobile information handling system may execute instructions via a processor such as a central processing unit (CPU), embedded controller, processor 102, or a microcontroller unit (MCU) operating both firmware instructions or hardwired instructions for the antenna controller 158 to achieve WLAN or WWAN antenna reconfiguration according to embodiments disclosed herein. The application programs operating on the information handling system 100 may communicate or otherwise operate via concurrent wireless links, individual wireless links, or combinations over any available radio access technology (RAT) protocols including WLAN and WWAN protocols. These application programs may operate in some example embodiments as software, in whole or in part, on an information handling system 100 while other portions of the software applications may operate on remote server systems. The antenna controller 158 of the presently disclosed embodiments may operate as firmware or hardwired circuitry or any combination on controllers or processors within the information handing system 100 for interface with components of a wireless interface adapter 144 and one or more antenna systems (e.g., Wi-Fi/Bluetooth protocol subsystem, cellular wireless protocol subsystem, and OOB Wi-Fi wireless protocol subsystem). It is understood that some aspects of the antenna controller 158 described herein may interface or operate as software or via other controllers associated with the wireless interface adapter 144 or elsewhere within information handling system 100. In an embodiment, the antenna controller 158 may control an RF switch 156 operatively coupling a shared antenna co-located with other antennas, in an embodiment, of plural wireless protocol subsystems 148-1, 148-2, 148-3 formed within the chassis of the information handling system 100 as described herein. The antenna controller 158 may, in the embodiments presented herein, operatively couple a wireless protocol subsystem 148-1, 148-2, 148-3 for one or more wireless protocols to the antenna element to excite the antenna element and dynamically switch between wireless protocols to be operated on the antenna in embodiments herein.

In order to switch between wireless protocol subsystems 148-1, 148-2, 148-3 to be operated at the antenna element, the antenna controller 158 may interface with and control circuitry of the RF switch 156. The RF switch 156 may be used to toggle between wireless communications of different radio wireless protocol technologies transceived by a shared antenna in an embodiment. The RF switch 156 may be any type of switch that may be operable on a wireless adapter printed circuit board (PCB), motherboard or other location near an antenna to switch an antenna element trace (e.g., shared antenna) between radios of different wireless protocols. A location of the RF switch 156 closer to the antenna may reduce loss for transmission along the traces in one example embodiment. In another embodiment, the antenna elements may be operatively coupled via coaxial cables or other electrical connection. The antenna controller 158 may be communicatively coupled to one or more RF switches for switching one or more shared antenna systems.

Information handling system 100 may also represent a networked server or other system from which some software applications are administered or which wireless communications such as across WLAN or WWAN may be conducted. In other aspects, networked servers or systems may operate the antenna controller 158 for use with a wireless interface adapter 144 on those devices similar to embodiments for WLAN or WWAN antenna reconfiguration operation according to according to various embodiments.

The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a display device 134, such as a liquid crystal display (LCD), an organic light emitting diode (OLED), a flat panel display, or a solid-state display. Display device 134 may include a touch screen display module and touch screen controller (not shown) for receiving user inputs to the information handling system 100. Touch screen display module may detect touch or proximity to a display screen by detecting capacitance changes in the display screen. Additionally, the information handling system 100 may include other input devices 112, such as a keyboard 142, and a cursor control device, such as a mouse 138, touchpad or track pad 136 or similar peripheral input devices.

The information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), a video/graphic display device 134, power transformers or battery, radio systems, or other input/output devices 112, and other components that may require power when a power button has been actuated by a user. In an embodiment, the PMU 118 may be electrically coupled to the information handling system 100 to provide this power and coupled to bus 108 to provide or receive data or instructions. The PMU 118 may regulate power from a power source such as a battery 126 or A/C power adapter 128. In an embodiment, the battery 126 may be charged via the A/C power adapter 128 and provide power to the components of the information handling system 100 when A/C power from the A/C power adapter 128 is removed.

The information handling system 100 can include a network interface device such as a wireless interface adapter 144. The information handling system 100 can also represent a server device whose resources can be shared by multiple client devices, or it can represent an individual client device, such as a desktop personal computer, a laptop computer, a tablet computer, a wearable computing device, or a mobile smart phone.

The information handling system 100 can include sets of instructions 124 that can be executed to cause the computer system to perform any one or more desired applications. In many aspects, sets of instructions 124 may implement wireless communications via one or more antenna systems such as the wireless protocol subsystems 148-1, 148-2, 148-3 available on information handling system 100. In embodiments presented herein, the sets of instructions 124 may implement wireless communications via one or more wireless protocol subsystems 148-1, 148-2, 148-3 as switched among the wireless protocol subsystems 148-1, 148-2, 148-3 formed as part of a laptop-type information handling system. Operation of WLAN and WWAN wireless communications may be enhanced or otherwise improved via WLAN or WWAN antenna switching adjustments via the methods or controller-based functions relating to the antenna controller 158 disclosed herein. For example, instructions or a controller may execute software or firmware applications or algorithms which utilize one or more wireless links for wireless communications via the wireless interface adapter as well as other aspects or components. The antenna controller 158 may execute instructions as disclosed herein for monitoring radio telemetry data of the wireless protocol subsystems 148-1, 148-2, 148-3. Also, antenna controller 158 may monitor information handling system configuration data, SAR proximity sensor detection, or other system data to determine system operation context such as activation states (e.g., idle, connected, scanning) or potential availability of one or more wireless protocol subsystems 148-1, 148-2, 148-3 or antenna systems. The term "antenna system" described herein is meant to be understood as any object that emits a RF (RF) electromagnetic (EM) wave therefrom. According to some embodiments described herein an "antenna system" includes any antenna element, slot, other antenna structure or portions thereof operating to transmit or receive wireless signals as described herein.

The antenna controller 158 may implement adjustments to select wireless antenna systems and resources via a radio frequency integrated circuit (RFIC) front end 152-1, 152-2, 152-3 and WLAN or WWAN wireless protocol subsystems 148-1, 148-2, 148-3 within the wireless interface device 144. Aspects of the antenna 154-1 and 154-2 reconfiguration for the antenna controller 158 may be included as part of the wireless interface adapter 144 and may affect switching at an RFIC front end 152-1, 152-2, 152-3 in some aspects or may be included with other aspects of the wireless interface device 144 such as WLAN radio module such as a Wi-Fi/Bluetooth wireless protocol subsystem or a WWAN radio module such as a cellular wireless protocol subsystem among the wireless protocol subsystems 148-1, 148-2, 148-3 shown in FIG. 1. The antenna controller 158 described in the present disclosure and operating with firmware or hardware (or in some parts software) may switch to or adjust one or more of a plurality of the antennas 154-1 and 154-2 of the antenna systems via selecting one or more of the antennas 154-1 and 154-2 to be coupled to the one or more wireless protocol subsystems 148-1, 148-2, 148-3 in various embodiments.

Multiple WLAN or WWAN antenna systems may operate on various communication frequency bands such as under IEEE 802.11a and IEEE 802.11g (i.e., medium frequency (MF) band, high frequency (HF) band, very high frequency (VHF) band, ultra-high frequency (UHF) band, L band, S band, C band, X band, $K_u$ band, K band, $K_a$ band, V band, W band, and millimeter wave bands) providing multiple band options for frequency channels. WWAN signals in embodiments of the present disclosure may include 2G standards such as GSM, 2.5G standards such as GSM EDGE and GPRS, 3G standards such as W-CDMA/UMTS and CDMA 2000, 4G standards such as LTE, LTE-A, LTE-LAA, 5G standards such as IMT-2020, 5G NR, LTE, or WiMAX, small cell WWAN, and the like. Wi-Fi signals in embodiments of the present disclosure may include Wi-Fi6 and 6E or other future or previous Wi-Fi standards. Wi-Fi and WLAN signals in embodiments of the present disclosure may include wireless links adhering to standards such as, for example, institute of electrical and electronics engineers (IEEE) 802.11 Wi-Fi, IEEE 802.11ad 60 Ghz Wi-Fi (Wi-Gig), IEEE 802.15 wireless personal area network (WPAN), and IEEE 802.11ax-2021 (e.g., Wi-Fi 6 and 6E, 6 GHz technologies). In other aspects, several antenna systems may be available for each radio access technology (RAT) to enable aggregated data communications such as via plural multiple in, multiple out (MIMO) streams to enhance bandwidth or reliability.

Further antenna radiation patterns and selection of shared antenna system options or power levels may be adapted due physical proximity of other antenna systems, of a user with potential SAR exposure, or improvement of RF channel operation according to received signal strength indicator (RSSI), signal to noise ratio (SNR), bit error rate (BER), modulation and coding scheme index values (MCS), or data throughput indications among other factors. In some aspects WWAN or WLAN antenna controller 158 may execute firmware algorithms or hardware to regulate operation of the RF switching among one or more antennas 154-1 and 154-2 to various WWAN or WLAN wireless protocol subsystems 148-1, 148-2, 148-3 in the information handling system 100 to avoid poor wireless link performance due to poor reception, poor MCS levels of data bandwidth available, or poor indication of throughput due to indications of low RSSI, low power levels available (such as due to SAR), inefficient radiation patterns among other potential effects on wireless link channels used in some embodiments.

Various software modules comprising software application instructions 124 or firmware instructions may be coordinated by a basic input output system (BIOS) firmware/software 130 and an OS 132 and via an application programming interface (API). An example OS 132 may include Windows®, Android®, and other OS types known in the art. Example APIs may include Win 32®, Core Java® API, Android® APIs, or wireless interface adapter driver API. In a further example, processor 102 may conduct processing of mobile information handling system applications by the information handling system 100 according to the systems and methods disclosed herein which may utilize wireless communications. The information handling system 100 may operate as a standalone device or may be connected such as using a network, to other computer systems or peripheral devices. In other aspects, additional processor or control logic may be implemented in graphical processor units (GPUs) or controllers located with radios 150-1, 150-2, 150-3 or within a wireless interface adapter 144 to implement method embodiments of the antenna controller 158 and antenna 154-1 and 154-2 reconfiguration according to embodiments herein. Code instructions 124 in firmware, hardware or some combination may be executed to implement operations of the antenna controller 158 and antenna reconfiguration on control logic or processor systems such as antenna controller 158 or other controllers (e.g., an embedded controller (EC)) within the wireless interface adapter 144 for example.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a tablet computer, a laptop computer, a desktop computer, a communications device, a wireless smart phone, wearable computing devices, a control system, a camera, a scanner, a printer, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Some memory or storage may reside in the wireless interface adapter 120. Further, the instructions 124 that embody one or more of the methods or logic as described herein. For example, instructions relating to the WWAN or WLAN antenna reconfiguration system or antenna switching adjustments described in embodiments herein may be stored here or transmitted to local memory located with the antenna controller 158, RFIC front end 152-1, 152-2, 152-3, or wireless protocol subsystems 148-1, 148-2, 148-3 in the wireless interface adapter 144.

In a particular embodiment, the instructions, parameters, and profiles 124 may reside completely, or at least partially, within a memory, such as non-volatile static memory, during execution of antenna switching by the antenna controller 158 in wireless interface adapter 144 of information handling system 100. As explained herein, some or all of the WWAN or WLAN antenna assigning algorithm 160 may be executed locally at the antenna controller 158, RFIC front end 152-1, 152-2, 152-3, or wireless protocol subsystems 148-1, 148-2, 148-3. Some aspects may operate remotely among those portions of the wireless interface adapter 144 or with the main memory 104 and the processor 102 or an embedded controller in parts including the computer-readable media in some embodiments.

The network interface device shown as wireless interface adapter 144 can provide connectivity to a network 146, e.g., a wide area network (WAN), a local area network (LAN), wireless local area network (WLAN), a wireless personal area network (WPAN), a wireless wide area network (WWAN), or other network. In an embodiment, the information handling system 100 may be communicatively coupled to the network 146 using any of the first wireless protocol subsystem 148-1, second wireless protocol subsystem 148-2, or third wireless protocol subsystem 148-3 to any of the access points 166 or base stations 168. It is understood that any of the first wireless protocol subsystem 148-1, second wireless protocol subsystem 148-2, or third wireless protocol subsystem 148-3 may each include a radio and front end as hardware forming, at least a portion of the respective subsystem. Connectivity may be via wired or wireless connection to these networks with these subsystems. Wireless interface adapter 144 may include one or more wireless protocol subsystems 148-1, 148-2, 148-3 with transmitter/receiver circuitry, modem circuitry, one or more RFIC front ends 152-1, 152-2, 152-3, one or more wireless controller circuits such as antenna controller 158, amplifiers, antennas 154-1 and 154-2 and other radio frequency (RF) subsystem circuitry for wireless communications via multiple radio access technologies. Each wireless protocol subsystem 148-1, 148-2, 148-3 may communicate using one or more wireless technology protocols. The wireless protocol subsystems 148-1, 148-2, 148-3 may contain individual subscriber identity module (SIM) profiles for each technology service provider and their available protocols for subscriber-based radio access technologies such as cellular LTE communications where necessary. The wireless interface adapter 144 may also include antennas 154-1 and 154-2 which may be tunable antennas or may include an antenna adaptation network for use with the system and methods disclosed herein to optimize antenna system operation. Additional antenna system adaptation network circuitry (not shown) may also be included with the wireless interface adapter 144 to implement WLAN or WWAN modification measures for shared antennas 154-1 and 154-2 and as described in various embodiments of the present disclosure.

In some aspects of the present disclosure, a wireless interface adapter 144 may operate two or more wireless links. In a further aspect, the wireless interface adapter 144 may operate the two or more wireless links with a single, shared communication frequency band such as with a Wi-Fi WLAN operation or 3GPP 5GNR or 4G LTE standard WWAN operations in an example aspect. For example, a 5 GHz wireless communication frequency band may be apportioned under the 5G standards for communication on either small cell WWAN wireless link operation or Wi-Fi WLAN operation as well as other wireless activity in LTE, WiFi, WiGig, Bluetooth, or other communication protocols. In some embodiments, the shared, wireless communication bands may be transmitted through one or a plurality of antennas 154-1 and 154-2. In an embodiment, the shared, wireless communication bands may be transmitted through one or a plurality of antennas 154-1 and 154-2, some of which may be switchable shared antennas, as described herein. Other communication frequency bands are contemplated for use with the embodiments of the present disclosure as well.

In other aspects, the information handling system 100 operating as a mobile information handling system may operate a plurality of wireless interface adapters 144 or a plurality of wireless protocol subsystems 148-1, 148-2, 148-3 for concurrent radio operation in one or more wireless communication bands. The plurality of wireless interface adapters 144 or a plurality of wireless protocol subsystems 148-1, 148-2, 148-3 may further operate in nearby wireless communication bands in some disclosed embodiments. Further, harmonics, environmental wireless conditions, and other effects may impact wireless link operation when a plurality of wireless links are operating as in some of the presently described embodiments. The series of potential effects on wireless link operation may cause an assessment of the wireless interface adapters 144 to potentially make antenna system selection adjustments according to the WWAN or WLAN antenna assigning algorithm 160 of the present disclosure.

The wireless interface adapter 144 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, or similar wireless standards may be used. The wireless interface adapter 144 may connect to any combination of macro-cellular wireless connections including 2G, 2.5G, 3G, 4G, 5G, or future 6G or the like from one or more service providers. Utilization of radiofrequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the 2.4/25 or ~5 GHz frequency bands such as under 802.11 a/h/j/n/ac/ax. It is understood that any number of available channels may be available under the 2.4, 5-7 GHz communication frequency bands. WLAN, for example, may also operate at a 2.4 GHz band. WWAN may operate in a number of bands, some of which are proprietary but may include a wireless communication frequency band at approximately 5 GHz or 6 GHz bands for example. In additional examples, a WWAN wireless protocol subsystem and carrier licensed bands may operate at frequency bands of approximately 700 MHz, 800 MHz, 1900 MHz, or 1700/2100 MHz as well as others in the new radio frequency range 1 (NRFR1) or NFRF2 bands sub-6 GHz or greater than 6 GHz, and other known bands. In the example embodiment, mobile information handling system 100 includes both unlicensed wireless RF communication capabilities as well as licensed wireless RF communication capabilities. For example, licensed wireless RF communication capabilities may be available via a subscriber carrier wireless service. With the licensed wireless RF communication capability, WWAN RF front end may operate on a licensed WWAN wireless radio with authorization for subscriber access to a wireless service provider on a carrier licensed frequency band. With the advent of 5G networks, any number of protocols may be implemented including global system for mobile communications (GSM) protocols, general packet radio service (GPRS) protocols, enhanced data rates for GSM evolution (EDGE) protocols, code-division multiple access (CDMA) protocols, universal mobile telecommunications system (UMTS) protocols, long term evolution (LTE) protocols, long term evolution advanced (LTE-A) protocols, WiMAX, LTE, and LTE Advanced, LTE-LAA, small cell WWAN and IP multimedia core network subsystem (IMS) protocols, for example, and any other communications protocols suitable for the method(s), system(s) and device(s) described herein, including any proprietary protocols. The protocols implemented may operate on certain 5G frequencies such as high frequency (HF) bands, very high frequency (VHF) bands, ultra-high frequency (UHF) bands, L band, S band, C band, X band, Ku band, K band, Ka band, V band, W band, and millimeter wave bands, among others.

The wireless interface adapter 144 can represent an add-in card, wireless network interface module that is integrated with a main board of the information handling system or integrated with another wireless network interface capability, or any combination thereof and may include an antenna controller 158 in some embodiments of the present disclosure. In an embodiment the wireless interface adapter 144 may include one or more wireless protocol subsystems 148-1, 148-2, 148-3 including transmitters and wireless controllers such as wireless module subsystems for connecting via a multitude of wireless links under a variety of protocols. The wireless protocol subsystems 148-1, 148-2, 148-3 include wireless controllers to manage authentication, connectivity, communications, power levels for transmission, buffering, error correction, baseband processing, and other functions of the wireless interface adapter 144 for one or more wireless protocols.

The wireless protocol subsystems 148-1, 148-2, 148-3 of the wireless interface adapters 144 may also be used to detect and measure various metrics relating to wireless communication pursuant to operation of an antenna 154-1 and 154-2 as in the present disclosure. For example, the antenna controller 158 or other processing device such as an embedded controller operatively coupled to a wireless protocol subsystems 148-1, 148-2, 148-3 may manage detecting and measuring radio telemetry data that may include operating frequency channel, operating frequency band, jitter, signal strength (RSSI), radio mode of operation (e.g., N×N MIMO), as well as other host detectible radio telemetry data such as bit error rates, signal to noise ratios, latencies, power delay profile, delay spread, among other metrics relating to signal quality and strength. These measured metrics may be referred to herein as radio telemetry data of the host information handling system 100. Such detected and measured aspects of wireless links, such as WWAN or WLAN links operating on one or more antennas 154-1 and 154-2, may be used by the antenna controller 158, via execution of the antenna assigning algorithm 160, to assign or reassign any one of the shared antennas 154-1 and 154-2 to be operatively coupled to one of the first wireless protocol subsystem 148-1 or the third wireless protocol subsystem 148-3 or to one of the second wireless protocol subsystem 148-2 or the third wireless protocol subsystem 148-3 according to various embodiments herein. In another embodiment, an antenna controller 158 of a wireless interface adapter 144 may manage one or more wireless protocol subsystems 148-1, 148-2, 148-3. The antenna controller 158 may also manage transmission power levels which directly affect wireless protocol subsystems 148-1, 148-2, 148-3 power consumption as well as transmission power levels from the plurality of antennas 154-1 and 154-2. The transmission power levels from the antennas 154-1 and 154-2 may be relevant to specific absorption rate (SAR) safety limitations for transmitting mobile information handling systems 100. To control and measure power consumption via a wireless protocol subsystem 148-1, 148-2, 148-3, the wireless protocol subsystems 148-1, 148-2, 148-3 may control and measure current and voltage power that is directed to operate one or more antennas 154-1 and 154-2.

The wireless protocol subsystems 148-1, 148-2, 148-3 of the wireless interface adapters 144 may also be used to detect and measure operational status of the first wireless protocol subsystem 148-1, the second wireless protocol subsystem 148-2, and the third wireless protocol subsystem 148-3 pursuant to determine assignment or reassignment of the antennas 154-1 and 154-2 described herein. This may be conducted by the antenna controller 158 along with an embedded controller (not shown), in a closed loop fashion, to reassign a first shareable antenna 154-1 or second shareable antenna 154-2 to be a shared and switched to be operatively coupled to the third wireless protocol subsystem 148-3 based on the operational status of these wireless protocol subsystems 148-1, 148-2, 148-3. For example, the antenna controller 158 may determine that, at least initially, the first shareable antenna 154-1 is to be operatively coupled to the third wireless protocol subsystem 148-3 so that the third wireless protocol subsystem 148-3, operating as an OOB Wi-Fi protocol subsystem, can gather OOB radio connection context. This information handling system management system may interface or collect data from administered wireless WLAN or WWAN on a remote or edge-based server at the remote data center in part and in part on one or more managed client information handling systems as well. The information handling management system may execute code instructions via an EC or other processor on the managed information handling systems such as the information handling system of FIG. 1 and at a remote location to conduct OOB communications to exchange this operational status data that includes OOB network channel telemetry data for antenna control according to the embodiments herein. In an embodiment, the OOB network channel telemetry data may include operating frequencies on the networks available to the information handling system, operating frequency bands of the networks available to the information handling system, network congestion data, network bandwidth, and network data transmission speeds, among others. The information handling system management systems and OOB communication may not require access or functions of an operating system (OS) in some embodiments allowing for OS-agnostic information handling system support, antenna provisioning, and other operations.

This radio telemetry data, along with the status information descriptive of operational status of the wireless protocol subsystems 148-1, 148-2, 148-3, may be used by the antenna controller 158 as input into the antenna assigning algorithm 160 in order to determine whether to reassign the first shareable antenna 154-1 to the first wireless protocol subsystem 148-1 and, instead, reassign the second sharable antenna 154-2 from the second wireless protocol subsystem 148-2 to the third wireless protocol subsystem 148-3 in an example embodiment. By using the operational status and OOB radio connection context data, one of many antennas 154-1 and 154-2 may be shared with the OOB third wireless protocol subsystem 148-3 in order to abstract channel state information processing side band telemetry from host and out of band radios concurrently while managing wireless front-end resources to support new radios and system capabilities while reducing system costs by not adding more antennas into the chassis of the information handling system 100.

Although the present specification describes that one or more antennas 154-1 or 154-2 is sharable with the third wireless protocol subsystem 148-3 (e.g., OOB Wi-Fi wireless protocol subsystem), the present specification contemplates that any of the antennas associated with either of the first wireless protocol subsystem 148-1 or second wireless protocol subsystem 148-2 may be reassigned to be used by the third wireless protocol subsystem 148-3 to conduct the OOB communications as described in some embodiments. In various embodiments, it is contemplated that more or fewer shareable antennas may be utilized than the number show in FIG. 1. The present specification further contemplates that as some intervals of operation of the systems and methods described herein, that the first shareable antenna 154-1 and second shareable antenna 154-2 remain operatively coupled to the first wireless protocol subsystem 148-1 and second wireless protocol subsystem 148-2. Still further, the present specification contemplates that each of the first wireless protocol subsystem 148-1 and second wireless protocol subsystem 148-2 may include a plurality of antennas operatively coupled to these wireless protocol subsystems that are not or cannot be operatively coupled to the third wireless protocol subsystem 148-3 during operation of the methods and systems described herein. In an embodiment, the execution of the antenna assignment algorithm 158 by the antenna controller 158 causes the dynamic pairing of the antennas 154-1 and 154-2 that meets the needs to persist connectivity across all three radios described herein (e.g., the first wireless protocol subsystem 148-1, the second wireless protocol subsystem 148-, and the third wireless protocol subsystem 148-3) in a closed loop fashion. This dynamic pairing is based on updated out-of-band radio connection context from the antenna controller 158 and the system operational context form the sideband communications.

The wireless network may have a wireless mesh architecture in accordance with mesh networks described by the wireless data communications standards or similar standards in some embodiments but not necessarily in all embodiments. The wireless interface adapter 144 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal; so that a device connected to a network 146 can communicate voice, video or data over the network 146. Further, the instructions 124 may be transmitted or received over the network 146 via the network interface device or wireless interface adapter 144.

Information handling system 100 includes one or more application programs 124, and Basic Input/Output System and firmware (BIOS/FW) code 130. BIOS/FW code 130 functions to initialize information handling system 100 on power up, to launch an operating system, and to manage input and output interactions between the operating system and the other elements of information handling system 100. In a particular embodiment, BIOS/FW code 130 reside in memory 104, and include machine-executable code that is executed by processor 102 to perform various functions of information handling system 100. In another embodiment (not illustrated), application programs and BIOS/FW code 130 reside in another storage medium of information handling system 100. For example, application programs and BIOS/FW code 130 can reside in drive 116, in a ROM (not illustrated) associated with information handling system 100, in an option-ROM (not illustrated) associated with various devices of information handling system 100, in a storage system (not illustrated) associated with network channel of a wireless interface adapter 144, in another storage medium of information handling system 100, or a combination thereof. Application programs 124 and BIOS/FW code 130 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
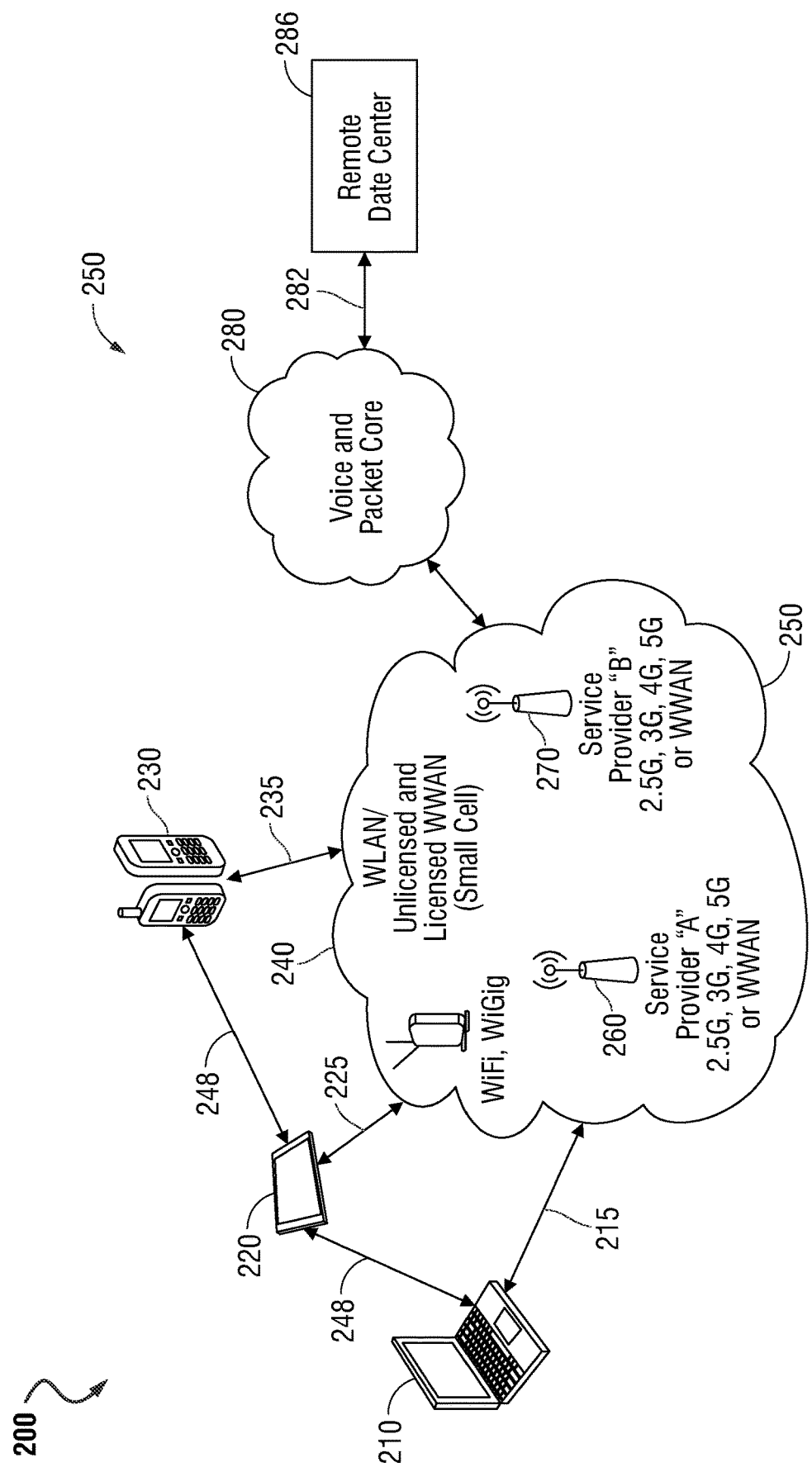
FIG. 2 is a block diagram of a network environment offering several communication protocol options and mobile information handling systems according to an embodiment of the present disclosure.

FIG. 2 illustrates a network 200 that can include one or more information handling systems 210, 220, 230. In a particular embodiment, network 200 includes networked mobile information handling systems 210, 220, and 230, wireless network access points, and multiple wireless connection link options. Wireless network access points may include WLAN access points 255 such as Wi-Fi or WiGig access points or small cell cellular access points such as gNodeB or eNodeB small cell access points or base station cellular access towers 260 or 270. A variety of additional computing resources of network 200 may include client mobile information handling systems, data processing servers, network storage devices, local and wide area networks, or other resources as needed or desired. As partially depicted, systems 210, 220, and 230 may be a laptop computer, tablet computer, 360-degree convertible systems, wearable computing devices, or a smart phone device. These mobile information handling systems 210, 220, and 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option such as gNodeB small cell access points for 5G technologies.

Since WPAN or Wi-Fi Direct Connection 248 and WWAN networks can functionally operate similar to WLANs, they may be considered as wireless local area networks (WLANs) for some purposes herein. Components of a WLAN may be connected by wireline or Ethernet connections to a wider external network. For example, wireless network access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11, IEEE 1914/1904, IEEE P2413/1471/42010, or 5G small cell WWAN communications such as gNodeB, 4G eNode B, or similar wireless network protocols. Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards and enhancements like LTE, LTE Advanced, and LTE-LAA, 5G, or 6G standards for small cells and macro cells or WiMAX and the like. Again, any number of protocols, 5G or otherwise, may be implemented as described herein. The protocols implemented may operate on certain 5G frequencies such as high frequency (HF) bands, very high frequency (VHF) bands, ultra-high frequency (UHF) bands, L band, S band, C band, X band, Ku band, K band, Ka band, V band, W band, and millimeter wave bands, among others. Frequency bands utilized may change for 5G and other protocols depending upon jurisdiction or location of operation of the antenna systems described herein.

Wireless local network 240 and macro-cellular network 250 may include a variety of licensed, unlicensed or shared communication frequency bands as well as a variety of wireless protocol technologies ranging from those operating in macrocells, small cells, picocells, or femtocells.

In some embodiments according to the present disclosure, a networked mobile information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or plural antennas may be shared on the wireless communication devices. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands, 3.5 GHz conditional shared communication frequency bands under FCC Part 96, or other sub 6 GHz frequency bands that may service 5G communication protocols. Wi-Fi ISM frequency bands that may also be subject to sharing include 2.4 GHz, 60 GHz, 900 MHz or similar bands as understood by those of skill in the art that may operate in harmonic frequency bands on shared antenna systems. Within local portion of wireless network 250 access points for Wi-Fi or WiGig as well as small cell WWAN connectivity may be available in 5G technology. This may create situations where a plurality of antenna systems are operating on a mobile information handling system 210, 220 or 230 via concurrent communication wireless links on both WLAN and WWAN and which may operate within the same, adjacent, and potentially interfering communication frequency bands. Such bands, or harmonic variations thereof, may be transceived on shared antenna systems according to embodiments herein. For example, a shared antenna may be a transmitting and receiving antenna that includes high-band, medium-band, low-band, and unlicensed band transmitting antennas. As described in various embodiments herein, transceiving antennas capable of receiving and transmitting according to various wireless protocols may include a subset of antennas that may be shared according to an antenna controller and one or more RF switches according to embodiments herein. Each of the antennas included in the information handling system 100 in an embodiment may be subject to the FCC regulations on specific absorption rate (SAR).

The voice and packet core network 280 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN or small cell WWAN before connecting directly to a mobile information handling system or may connect directly to one or more mobile information handling systems 210, 220, and 230. Alternatively, mobile information handling systems 210, 220, and 230 may connect to the external network via base station locations at service providers or private LTE networks such as 260 and 270. These service provider or other WWAN locations may be network connected via backhaul connectivity through the voice and packet core network 280.

Remote data centers may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile information handling systems 210, 220, and 230 allowing streamlining and efficiency within those devices. Similarly, remote data center permits fewer resources to be maintained in other parts of network 200.

Although 215, 225, and 235 are shown connecting wireless interface adapters of mobile information handling systems 210, 220, and 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower such as that shown with service provider A 260 or service provider B 270 and in network 250. In other aspects, mobile information handling systems 210, 220, and 230 may communicate intra-device via 248 when one or more of the mobile information handling systems 210, 220, and 230 are set to act as an access point or even potentially an WWAN connection via small cell communication on licensed or unlicensed WWAN connections. For example, one of mobile information handling systems 210, 220, and 230 may serve as a Wi-Fi hotspot in an embodiment. Concurrent wireless links to information handling systems 210, 220, and 230 may be connected via any access points including other mobile information handling systems as illustrated in FIG. 2.

As described herein, an embedded controller of each of the information handling systems 210, 220, and 230 may operate an OOB communication via a wireless protocol subsystem according to some embodiments. In an embodiment, this wireless protocol subsystem is an OOB Wi-Fi wireless protocol subsystem that has been assigned one of the antennas from, for example, a Wi-Fi/Bluetooth wireless protocol subsystem or, in some embodiments to a share an antenna with a cellular wireless protocol subsystem. This allows the OOB Wi-Fi wireless protocol subsystem to access a remote data center 286 that, in this embodiment, includes an information handling system management system (not shown), such as Dell Optimizer®. This information handling system management system may be used to manage client information handling systems such as the information handling systems 210, 220, and 230 of FIG. 2, for example, as part of an enterprise's deployed information handling systems. This information handling system management system may interface or collect data from administered wireless WLAN or WWAN on a remote or edge-based server at the remote data center in part and in part on one or more managed client information handling systems as well. The information handling management system may execute code instructions of an information handling system management system such as Dell Optimizer® via an EC or other processor on the managed information handling systems such as the information handling system of FIG. 1 and at a remote location via conducting OOB communications to exchange this operational status data that includes the OOB network channel telemetry data for antenna control according to the embodiments herein. In an embodiment, the OOB network channel telemetry data may include operating frequencies on the networks available to the information handling system, operating frequency bands of the networks available to the information handling system, network congestion data, network bandwidth, and network data transmission speeds, among others. The embedded controller and antenna controller may conduct OOB wireless communications with a Wi-Fi wireless protocol subsystem and determine shared antenna allocation to OOB and other wireless communications as well as conduct provisioning via the information handling system management system without operation of the OS and for any OS-type.

Figure 3:
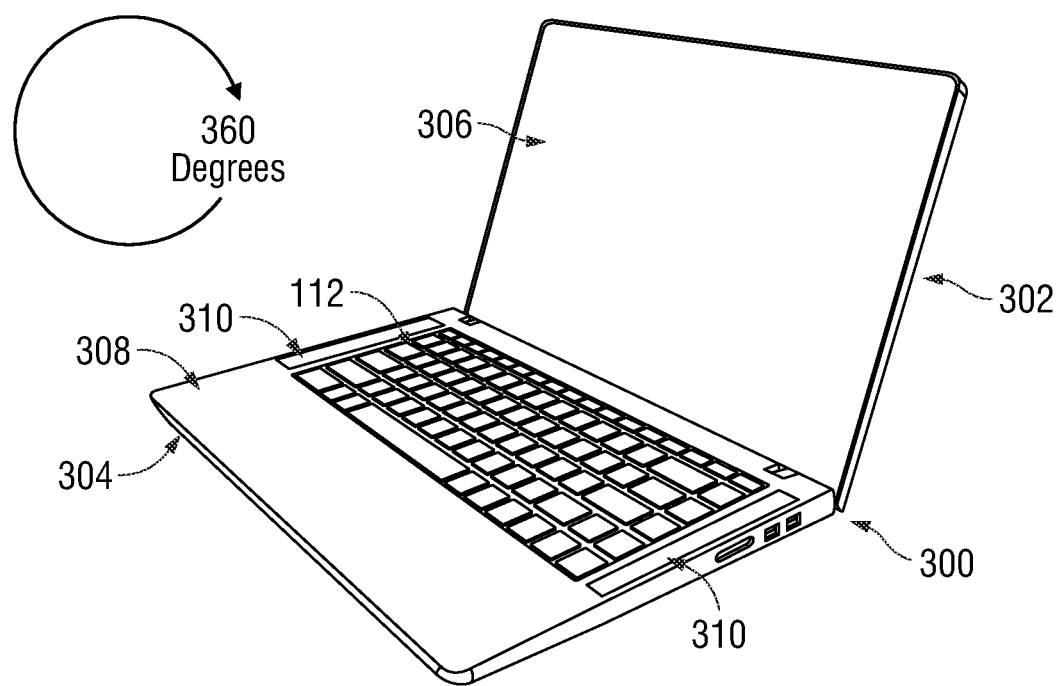
FIG. 3 is a graphical illustration of an information handling system placed in an open configuration according to an embodiment of the present disclosure.

FIG. 3 is a graphical illustration of an information handling system with a metal chassis including a base chassis and display chassis placed in an open configuration according to an embodiment of the present disclosure. The open configuration is shown for illustration purposes. It is understood that a closed configuration would have the lid chassis fully closed onto the base chassis. The metal chassis 300 in an embodiment may comprise an outer metal case or shell of an information handling system such as a tablet device, laptop, or other mobile information handling system. As shown in FIG. 3, the metal chassis 300, in an embodiment, may further include a plurality of chassis or cases. For example, the metal chassis 300 may further include an A-cover 302 functioning to enclose a portion of the information handling system such as a display chassis which may include one or more antenna systems according to an embodiment. As another example, the metal chassis 300, in an embodiment, may further include a D-cover 304 functioning to enclose another portion of the information handling system along with a C-cover 308 which may include a transmitting/receiving antenna according to the embodiments described herein. The C-cover 308 may include, for example, a keyboard, a trackpad, or other input/output (I/O) device. When placed in the closed configuration, the A-cover 302 forms a top outer protective shell, or a portion of a lid for the information handling system, while the D-cover 304 forms a bottom outer protective shell, or a portion of a base. When in the fully closed configuration, the A-cover 302 and the D-cover 304 would be substantially parallel to one another. Metal chassis 300, with plural chassis portions, may comprise a laptop or a convertible laptop with base chassis and display chassis or dual screen information handling system with plural screen chassis portions housing base chassis components in some embodiments. In embodiments, chassis components 300 (e.g., 302 and 304) may be 360° rotatable about a hinge and may be configured in a plurality of orientations and configurations (e.g., closed, laptop, tablet, dual tablet, tent, etc.).

In some embodiments, either or both of the A-cover 302 or the D-cover 304 may be comprised of metal restricting locations where antenna systems may be implemented. The B-cover 306 may be a display screen with little or no bezel further restricting location available for antenna placement. Further, multiple RATs are used with such an information handling system such as shown in FIG. 3 requiring accommodation of a greater set of frequency ranges and antennas taking more space and size within the information handling system. In some embodiments, the A-cover 302 and D-cover 304 may include metallic or plastic components. For example, some plastic components that are radio-frequency (RF) transparent may be used to form a portion of the C-cover 308 or D-cover 304 in part however limited portions of plastic may be used for aesthetic reasons. The formation of plural antenna systems may be placed at the A-cover 302 or B-cover 306 or a place for several antenna systems deployed in the base chassis of the C-cover 308 and D-cover 304. With the space within the A-cover 302/B-cover 306 assembly where an antenna may have been placed being eliminated to allow for a relatively larger video display device placed therein in some embodiments, plural antenna elements or slots may be placed within the C-cover 308 and D-cover 304 such that the capabilities of the information handling system may be increased while also increasing user satisfaction during use. In the embodiments, each of several antenna elements for Wi-Fi/Bluetooth® (BT) as well as cellular communications according to embodiments herein may be excited to emit an RF EM wave signal at different frequencies allowing for the ability of the information handling system to communicate on a variety of RATs. As described, some antennas may be shared antennas according to various embodiments herein.

Figure 4:
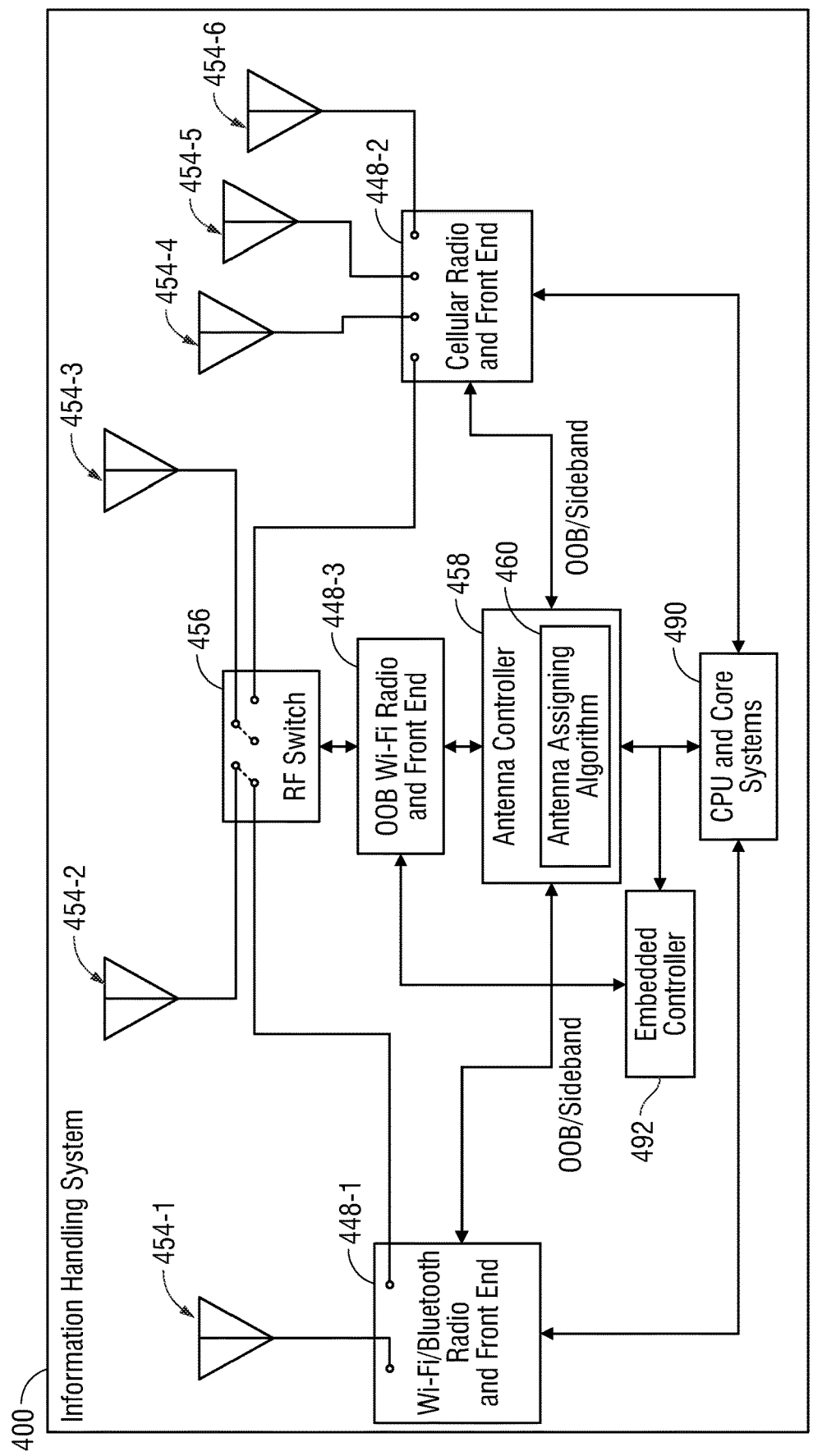
FIG. 4 is a block diagram of plural antennas, antenna controller, and wireless sub-systems according to an embodiment of the present disclosure.

FIG. 4 is a block diagram of an information handling system with several antennas 454-1, 454-2, 454-3, 454-4, 454-5, 454-6 deployed according to an embodiment of the present disclosure. In the shown example, a central processing unit 490 of a core system may provide data for wireless communications to any of a plurality of radio modules 448-1, 448-2, 448-3 for wireless protocol subsystems available to an information handling system 400.

As shown in FIG. 4, a Wi-Fi and BT radio and front end 448-1 may be a radio module such as a radio card with front end controllers that may be operatively coupled to two antennas 454-1 and 454-2 to excite those antennas in order to cause the antennas to emit one or a plurality of frequencies based on the target frequency or a plurality of target frequencies. A first antenna element 454-1 may be allocated for BT wireless communications or for Wi-Fi wireless communications based on the wireless protocol being utilized at Wi-Fi radio module 426 which may also support Bluetooth wireless communication on the same system-on-chip (SOC). Such a system may additionally alternate use of a second antenna 454-2 between a Wi-Fi (e.g., at 2.4 GHz)/Bluetooth communication link and a OOB Wi-Fi communication link via the OOB Wi-Fi radio and front end 448-3 operating an OOB Wi-Fi wireless protocol. The second antenna element 454-2, in one orientation, may be allocated for additional Wi-Fi wireless communication such as to accommodate a different frequency band than the first antenna or provide for MIMO 2×2 Wi-Fi capability when the second antenna element 454-2 is not allocated by the antenna controller 458 to be operatively coupled to the OOB Wi-Fi radio and front end 448-3. In some example embodiments, OOB Wi-Fi radio and front end 448-3 may not always be in use simultaneously. In such an embodiment, RF switch 456 may be used to share the second antenna 454-2 between the OOB Wi-Fi radio and front end 448-3 and the Wi-Fi/Bluetooth radio and front end 448-1.

Also shown in FIG. 4, a cellular radio and front end 448-2 may be a radio module such as a radio card and front-end controllers that may be operatively coupled to four antennas: a third antenna 454-3, a fourth antenna 454-4, a fifth antenna 454-5, and a sixth antenna 454-6. The cellular radio and front end 448-2 may excite those antennas in order to cause the antennas to emit one or a plurality of frequencies based on the target frequency or a plurality of target frequencies for cellular wireless communications in 2.5 G, 3G, 4G, or 5G protocols in various embodiments. The four antennas 454-3, 454-4, 454-5, and 454-6 may be allocated for different cellular wireless communication frequency bands and/or may provide for MIMO 4×4 cellular capability. As such, four antennas 454-3, 454-4, 454-5, and 454-6 may be operatively coupled to the cellular radio and front end 448-2 within a cellular RF subsystem. In some embodiments, the OOB Wi-Fi radio and front end 448-3 and cellular radio and front end 448 may not be operating simultaneously in whole or in part. In such an embodiment, the third antenna 454-3 may be shared via switching of RF switch 456.

In the example embodiments shown in FIG. 4, these six antennas are utilized to support the three different wireless protocol RF subsystems: a Wi-fi/Bluetooth wireless protocol, a cellular wireless protocol, and an OOB Wi-Fi wireless protocol. Two antennas may be initially allocated to the Wi-Fi and BT radio and front end 448-1 and four antennas are initially allocated to the cellular radio and front end 448-2. During operation of an information handling system 400, the second antenna 454-2 or third antenna 454-3 may be switched to be operatively coupled to the OOB Wi-Fi radio and front end 448-3 in order to support an OOB communication link to a network to harvest out-of-band (OOB) network channel telemetry data as described herein.

In an embodiment, the information handling system 400 may initiate, via the antenna controller 458, a sideband communication link with the Wi-Fi and BT radio and front end 448-1 and cellular radio and front end 448-2. This sideband communication includes a request from the antenna controller 458 for status information indicating operational status of the OOB Wi-Fi radio and front end 448-3, the cellular radio and front end 448-2, and the Wi-Fi and BT radio and front end 448-1 such as whether these radios and front-ends are idle, connected to a network, or is currently scanning for a wireless network to be communicatively coupled to. This side band communications are conducted by the antenna controller 458 and do not require OS-level execution. The request may also include a request for frequency channel, frequency band, jitter, signal strength telemetry data, and radio mode of operation (e.g., N×N MIMO), as well as other host detectible radio telemetry data as described herein.

In an embodiment, the system operational context data and radio telemetry data may include wireless application telemetry data descriptive of an application being executed by the CPU 490. The application being executed on the information handling system may include applications that require high bandwidth that is supportable through the use of a 4×4 MIMO connection at the cellular radio and front end 448-2. In this embodiment, the antenna controller 458 may execute the antenna assigning algorithm 460 and use as input the application telemetry data, the system operational context data, the radio telemetry data, among other operating characteristics of the Wi-Fi and BT radio and front end 448-1, OOB Wi-Fi radio and front end 448-3, and cellular radio and front end 448-2 to determine which of the second antenna 454-2 or third antenna 454-3 is to be reassigned and operatively coupled to the OOB Wi-Fi radio and front end 448-3. The decision as to which of the second antenna 454-2 and third antenna 454-3 to assign or reassign for use at the OOB Wi-Fi radio and front end 448-3 is dependent on this data and the method of application of that data by the antenna assigning algorithm 460.

When either of the second antenna 454-2 or third antenna 454-3 are assigned to the OOB Wi-Fi radio and front end 448-3, the antenna controller 458 may access an RF switch 456 and assign either of the second antenna 454-2 or third antenna 454-3 to the OOB Wi-Fi radio and front end 448-3 accordingly. The RF switch 456 may include any type of switch that may assign the second antenna 454-2 to the OOB Wi-Fi radio and front end 448-3 while concurrently maintaining the operatively coupling of the third antenna 454-3 to the cellular radio and front end 448-2. In an alternative embodiment, where the third antenna 454-3 is to be assigned to the OOB Wi-Fi radio and front end 448-3, the antenna controller 458 may access the RF switch 456 to switch the third antenna 454-3 to be operatively coupled to the OOB Wi-Fi radio and front end 448-3 while maintaining the operative coupling of the second antenna 454-2 with the Wi-Fi and BT radio and front end 448-1.

Once the antenna controller 458 has determined to assign one of the third antenna 454-3 and second antenna 454-2 to the OOB Wi-Fi radio and front end 448-3, and has accessed the RF switch 456 to make that assignment, the OOB Wi-Fi radio and front end 448-3 may access, for example, an information handling system management system on a network (e.g., Wi-Fi network or cellular network) to harvest out-of-band (OOB) network channel telemetry data. With the out-of-band (OOB) network channel telemetry data, the antenna controller 458 may execute the antenna controller 458 in a closed loop fashion to determine whether and when to reassign one of the second antenna 454-2 or third antenna 454-3 to be operatively coupled to the OOB Wi-Fi radio and front end 448-3. In this manner, the antenna controller 458 may manage the wireless resources of the information handling system 400 by cross pollinating antennas 454-2 and 454-3 across the cellular radio and front end 448-2, Wi-Fi and BT radio and front end 448-1, and OOB Wi-Fi radio and front end 448-3 thereby avoiding the need to add additional antennas within the chassis of the information handling system 400.

The execution of the antenna assigning algorithm 460 by the antenna controller 458 includes the request and receipt of the radio telemetry data and system operational context data from the cellular radio and front end 448-2, Wi-Fi and BT radio and front end 448-1, and OOB Wi-Fi radio and front end 448-3. The antenna controller 458 may then use this data to help reassign or assign the second antenna 454-2 or the third antenna 454-3 (in the context of FIG. 4) to be operatively coupled to the OOB Wi-Fi radio and front end 448-3. An example representation of the antenna assigning algorithm 460 may be found in the example table, Table 1, represented here:

TABLE 1

| | Radio Context/ Antenna Management and Signaling Manager Decision | | | Antenna Management and Signaling Manager Dynamic Antenna Paring Logic Table (7 Radio ports, 6 Antennas, 3 Radios) | | | | | | |
|---|---|---|---|---|---|---|---|---|---|---|
| Context | EC OOB Wi-Fi | Host BT/ WLAN | Host WWAN | EC OOB Wi-Fi | Host BT/ Wi-Fi Ant 1 | Host Wi-Fi Ant 2 | Cellular Ant 3 | Cellular Ant 4 | Cellular Ant 5 | Cellular Ant 6 |
| Context #0 | Idle/Scan | Idle/Scan | Idle/Scan | Host Wi-Fi Ant 2 | Host BT/ Wi-Fi Ant 1 | Unused | Cellular Ant 3 | Unused | Unused | Unused |
| Context #1 | Idle/Scan | Idle/Scan | Connected 5G (4 × 4) | Host Wi-Fi Ant 2 | Host BT/ Wi-Fi Ant 1 | Unused | Cellular Ant 3 | Cellular Ant 4 | Cellular Ant 5 | Cellular Ant 6 |
| Context #2 | Connected (1 × 1) | Idle/Scan | Connected 5G (4 × 4) | Host Wi-Fi Ant 2 | Host BT/ Wi-Fi Ant 1 | Unused | Cellular Ant 3 | Cellular Ant 4 | Cellular Ant 5 | Cellular Ant 6 |
| Context #3 | Idle/Scan | Connected (2 × 2) | Connected Drop to 4G (2 × 2) | Cellular Ant 6 | Host BT/ Wi-Fi Ant 1 | Host Wi-Fi Ant 2 | Cellular Ant 3 | Cellular Ant 4 | Unused | Re-purposed to EC OOB Wi-Fi |
| Context #4 | Connected (1 × 1) | Connected (2 × 2) | Connected Drop to 4G (2 × 2) | Cellular Ant 6 | Host BT/ Wi-Fi Ant 1 | Host Wi-Fi Ant 2 | Cellular Ant 3 | Cellular Ant 4 | Unused | Unused |
| Context #5 | Connected (1 × 1) | Connected (2 × 2) | Idle/Scan | Cellular Ant 6 | Host BT/ Wi-Fi Ant 1 | Host Wi-Fi Ant 2 | Cellular Ant 3 | Unused | Unused | Unused |

Table 1 shows a number of contexts in which the information handling system 400 may operate under an antenna assignment algorithm 460. In the embodiment examples presented in Table 1, each of the antenna assignment designations include a radio context that describes, at least in part, the radio telemetry data that describes the current connection state (e.g., idle, connected, scanning, etc.) as well as frequency channel, frequency band, jitter, signal strength, and radio mode of operation (e.g., N×N MIMO) of each of the wireless protocol subsystem including the Wi-Fi and BT radio and front end 448-1, the OOB Wi-Fi radio and front end 448-3, and the cellular radio and front end 448-2. In an example context shown as context #3 in the first column of Table 1, the OOB Wi-Fi radio and front end 448-3 (e.g., "EC OOB Wi-Fi") is, via sideband communication from the antenna controller 458, identified as being idle and/or scanning for a network to be communicatively coupled to via an OOB communication link. The Wi-Fi and BT radio and front end 448-1 (e.g., "Host BT/WLAN") in context #3 shows that the Wi-Fi and BT radio and front end 448-1 is currently connected to a Wi-Fi network using a 2×2 MIMO radio mode. In context #3, the cellular radio and front end 448-2 (e.g., "Host WWAN") is shown to be connected to a cellular network and is operated using a 2×2 MIMO under a 4G protocol.

This radio telemetry data obtained from the Wi-Fi and BT radio and front end 448-1, cellular radio and front end 448-2, and OOB Wi-Fi radio and front end 448-3 via the sideband communication may be provided to the antenna controller 458 so that the antenna controller 458 can assign, in this example embodiment, one of the second antenna 454-2 or the third antenna 454-3 to be operatively coupled to the OOB Wi-Fi radio and front end 448-3. To do so, the antenna controller 458 may use the radio telemetry data, as input, into the antenna assigning algorithm 460 to direct this reassignment of one of the second antenna 454-2 or third antenna 454-3. In the embodiments described herein, the antenna controller 458 may form part of or be operatively coupled to an antenna management and signaling manager (not shown). This antenna management and signaling manager, in an embodiment, may act as a pass through of the radio telemetry data and status information descriptive of operational status of the wireless protocol subsystems. In an embodiment, the antenna management and signaling manager may also manage the monitoring of the radio telemetry data and status information, mange any eUICC (e.g., embedded subscriber identity module (eSIM)) management, and interface with a SM-DP server to land profiles. In an embodiment, the antenna management and signaling manager may also communicate with the embedded controller 492 to conduct the OOB communication with a network to obtain out-of-band (OOB) network channel telemetry data. In an embodiment, the antenna management and signaling manager may also receive data descriptive of applications being executed by the CPU and core systems 490 from the CPU and core systems 490 in order to determine wireless data bandwidth needs to facilitate the operation of those executed applications. In an embodiment, the antenna management and signaling manager may also, with the antenna controller 458 and embedded controller 492, configure the radio frequencies (RFs) at which any of the antennas 454-1, 454-2, 454-3, 454-4, 454-5, 454-6 operate.

Context #3 in Table 1 indicates that the antenna management and signaling manager with the antenna controller 458 and after gathering the radio telemetry data, assigns one of the second antenna 454-2 or third antenna 454-3 to be operatively coupled to the OOB Wi-Fi radio and front end 448-3. As described herein, the execution of the antenna assigning algorithm 460 provides output to the antenna management and signaling manager antenna controller 458 indicating which antenna to operatively couple to the OOB Wi-Fi radio and front end 448-3. In Context #3 of Table 1, the third antenna 454-3 originally coupled to the cellular radio and front end 448-2 is reassigned to the OOB Wi-Fi radio and front end 448-3 for the OOB Wi-Fi radio and front end 448-3 to harvest out-of-band (OOB) network channel telemetry data as described herein. In order to operatively switch the third antenna 454-3 from an antenna port at the cellular radio and front end 448-2 to the antenna port of the OOB Wi-Fi radio and front end 448-3, the antenna controller 458 may signal to the RF switch 456. This signal causes the lead from the cellular radio and front end 448-2 to the third antenna 454-3 to be disconnected and the lead from the OOB Wi-Fi radio and front end 448-3 to be operatively coupled to the OOB Wi-Fi radio and front end 448-3 via RF switch 456. In an embodiment, the operation of the RF switch 456 prevents the second antenna 454-2 from being operatively coupled to the OOB Wi-Fi radio and front end 448-3 when the third antenna 454-3 is to be operatively coupled to the OOB Wi-Fi radio and front end 448-3. In this embodiment, the RF switch 456 may include a single pole, double throw switch such that the OOB Wi-Fi radio and front end 448-3 is coupled to either the second antenna 454-2 or third antenna 454-3 or not operatively coupled to either the second antenna 454-2 or third antenna 454-3. The present specification contemplates, however, that the RF switch 456 may be any type or numbers of switches that allows the OOB Wi-Fi radio and front end 448-3 to be operatively coupled to any of one or more shared antennas in order to harvest the out-of-band (OOB) network channel telemetry data.

Table 1, due to the input context data represented by the "Radio Context/Antenna Management and Signaling Manager Decision" heading, provides a mapping of each of the six antennas 454-1, 454-2, 454-3, 454-4, 454-5, 454-6 to each of the OOB Wi-Fi radio and front end 448-3, the cellular radio and front end 448-2, and the Wi-Fi and BT radio and front end 448-1 in an example embodiment. Under the header "Antenna Management and Signaling Manager Dynamic Antenna Paring Logic Table," Table 1 provides example output from the antenna controller 458 executing the antenna assigning algorithm 460 as described herein based on detected contexts as received from plural inputs of the information handling system or OOB communications with an information handling system remote management system or local agent and the antenna controller 458 in some embodiments. In Context #3, therefore, the OOB Wi-Fi radio and front end 448-3 (e.g., "EC OOB Wi-Fi") is assigned the third antenna 454-3 (e.g., "Cellular Ant 3"). As described herein, the execution of the antenna assigning algorithm 460 may mandate that the OOB Wi-Fi radio and front end 448-3 be operatively coupled to an antenna 454-1, 454-2, 454-3, 454-4, 454-5, 454-6 so that at any given time, the OOB Wi-Fi radio and front end 448-3 may be operatively coupled to a network to harvest out-of-band (OOB) network channel telemetry data according to the instructions of the embedded controller 492. Context #3 further shows as output that a first port of the Wi-Fi and BT radio and front end 448-1 (e.g., Host BT/Wi-Fi Ant 1") is assigned the first antenna 454-1. Further, the second port of the Wi-Fi and BT radio and front end 448-1 (e.g., "Host Wi-Fi Ant 2") is indicated as having the second antenna 454-2 assigned thereto. With reference to FIG. 4, this is indicated by the RF switch 456 completing the circuit between the second port of the Wi-Fi and BT radio and front end 448-1 to the second antenna 454-2 (dashed lines). As output in Context #3, the third antenna 454-3 is no longer operatively coupled to the cellular radio and front end 448-2 and instead the first port of the cellular radio and front end 448-2 (e.g., "Cellular Ant 3) shows that the third antenna 454-3 has been repurposed (e.g., "Repurposed to EC OOB Wi-Fi"). Again, the RF switch 456, being controlled by the antenna controller 458, has disconnected the lead between the third antenna 454-3 and the first port of the cellular radio and front end 448-2 and reconnected the third antenna 454-3 to the port of the OOB Wi-Fi radio and front end 448-3. The second port (e.g., "Cellular Ant 4") of the cellular radio and front end 448-2 is operatively coupled to the fourth antenna 454-4 but is indicated as being unused. In this embodiment, the antenna controller 458 as operated by the antenna management and signaling manager, has indicated that because the cellular radio and front end 448-2 (e.g., "Host WWAN" column 4, Table 1) is operating under a 4G 2×2 MIMO configuration, the fourth antenna 454-4 is not being used at this time. However, if the antenna management and signaling manager could use the fourth antenna 454-4 in a 3×3 MIMO configuration, the fourth antenna 454-4 may be used in that situation. Also, because the cellular radio and front end 448-2 is operating under a 4G 2×2 MIMO configuration, the fifth antenna 454-5 and sixth antenna 454-6 are assigned to operate at the third and fourth ports, respectively, of the cellular radio and front end 448-2. It is appreciated, therefore, that the output from the execution of the antenna assigning algorithm 460 may change as the input data (e.g., Radio Context/Antenna Management and Signaling Manager Decision") changes as indicated by other example contexts listed in Table 1.

In an embodiment, the antenna management and signaling manager along with the embedded controller 492 may conduct the harvesting of the out-of-band (OOB) network channel telemetry data without the operation of the CPU and core systems 490. In this embodiment, the embedded controller 492 may control the OOB Wi-Fi radio and front end 448-3 such that OS agnostic backend support is enabled at the information handling system. This may create frictionless provisioning of a profile (e.g., cellular profile for an eSIM card in the information handling system 400) may otherwise be challenged by architecture complexity and multiple agents or services required to be integrated and sustained at the information handling system. By placing the OOB communication with the embedded controller 492 under the direction of the antenna management and signaling manager, the out-of-band (OOB) network channel telemetry data may be harvested without the interaction of the OS of the information handling system 400.

Although FIG. 4 shows that it is the third antenna 454-3 and second antenna 454-2 that may be switched to be operatively coupleable to the OOB Wi-Fi radio and front end 448-3, the present specification contemplates that any of the antennas 454-1, 454-2, 454-3, 454-4, 454-5, 454-6 of the Wi-Fi and BT radio and front end 448-1 or cellular radio and front end 448-2 may be coupleable to the OOB Wi-Fi radio and front end 448-3. The present specification further contemplates that more or less than those number of antennas 454-1, 454-2, 454-3, 454-4, 454-5, 454-6 shown in FIG. 4 may be included within the chassis of the information handling system. Additionally, although FIG. 4 shows a single Wi-Fi and BT radio and front end 448-1, a single cellular radio and front end 448-2, and a single OOB Wi-Fi radio and front end 448-3, the present specification contemplates that multiple radios and front ends may be used and operated according to the principles described herein.

Table 1 shows five contexts or example embodiments by which an antenna assigning algorithm 460 may receive input data of radio telemetry data, sideband communication telemetry data, network operating frequency band data, network frequency channels data, signal strength telemetry data, wireless application telemetry data, or orientation data, and detect among various radio contexts to determine antenna assignment among the second antenna 454-2 or third antenna 454-3 for OOB Wi-Fi, Wi-Fi/BT, or cellular configurations as well as utilization of the remaining antennas 454-1, 454-4, 454-5, 454-6. It is contemplated that fewer or additional radio contexts may be unutilized by the antenna assigning algorithm 460 in other embodiments or with other antenna setups and available radios.

The methods and processes described herein allows for the dynamic sharing of an antenna to the OOB Wi-Fi radio and front end 448-3 to harvest OOB radio channel telemetry via an embedded controller within the information handling system 400. The antenna assigning algorithm 460 executed by the antenna controller 458 may abstract channel state information from obtained side-band telemetry in the information handling system 400 to provide output antenna assignments at each of the Wi-Fi and BT radio and front end 448-1, the cellular radio and front end 448-2, and the OOB Wi-Fi radio and front end 448-3. This may be done in a closed loop fashion from the data obtained by the information handling system 400 and from the OOB Wi-Fi radio and front end 448-3. This method described herein may utilize an RF switch 456 to dynamically switch the antennas 454-1, 454-2, 454-3, 454-4, 454-5, 454-6 operatively coupled to the OOB Wi-Fi radio and front end 448-3 to keep all of the radios and front ends operating, in an example embodiment.

Figure 5:
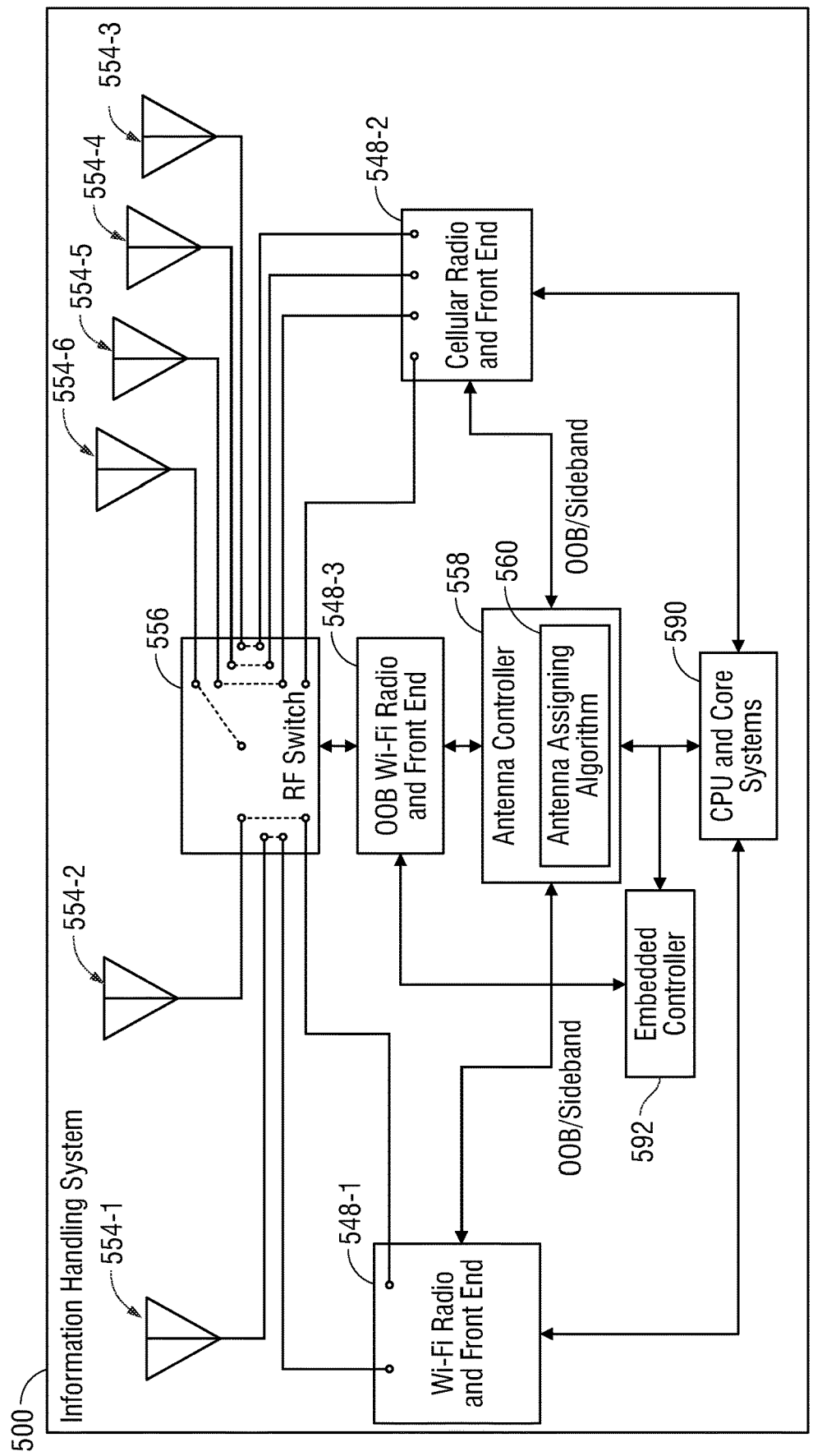
FIG. 5 is a block diagram of plural antennas, antenna controller, and wireless sub-systems according to another embodiment of the present disclosure.

FIG. 5 is a block diagram of an information handling system 500 with several antenna systems deployed with a shared antenna system according to an embodiment of the present disclosure. In the shown embodiment, a central processing unit 502 of a core information handling system may provide data for wireless communications to either of a plurality of radio modules for wireless protocol subsystems available to an information handling system. This results in the OOB Wi-Fi radio and front end 448-3 being capable of harvesting out-of-band (OOB) network channel telemetry data continuously or near continuously so that the antenna management and signaling manager and antenna controller 458 can keep the OOB Wi-Fi radio and front end 448-3 available to be connected to a network upon detection of a provisioning event in an example embodiment.

FIG. 5 is a block diagram of plural antennas 554-1, 554-2, 554-3, 554-4, 554-5, 554-6, antenna controller 558, and wireless sub-systems 548-1, 548-2, 548-3 according to another embodiment of the present disclosure. Similar to the example shown in FIG. 4, the example in FIG. 5 shows a central processing unit 590 of a core system capable of providing data for wireless communications to either of a plurality of radios for wireless sub-systems 548-1, 548-2, 548-3 available to an information handling system 500.

Here, a Wi-Fi and BT radio and front end 548-1 may be a radio module such as a radio card with front end controllers that may be operatively coupled to two antennas: a first antenna 554-1 and a second antenna 554-2 to excite those antennas in order to cause the antennas to emit one or a plurality of frequencies based on the target frequency or a plurality of target frequencies. The first antenna 554-1 may be allocated for BT wireless communications or for Wi-Fi wireless communications (or alternate) based on the wireless protocol being utilized at Wi-Fi and BT radio and front end 548-1. Such a system may additionally alternate use of a second antenna 554-2 between a Wi-Fi (e.g., at 2.4 GHz)/Bluetooth communication link and a OOB Wi-Fi communication link via the OOB Wi-Fi radio and front end 548-3 operating an OOB Wi-Fi wireless protocol. The second antenna 554-2, in one orientation or based on a set of detected context conditions, may be allocated for additional Wi-Fi wireless communication such as to accommodate a different frequency band than the first antenna or provide for MIMO 2×2 Wi-Fi capability when the second antenna element 554-2 is not allocated by the antenna controller 558 to be operatively coupled to the OOB Wi-Fi radio and front end 548-3.

Also shown in FIG. 5, a cellular radio and front end 548-2 may be a radio module such as a radio card and front-end controllers that may be operatively coupled to four antennas: a third antenna 554-3, a fourth antenna 554-4, a fifth antenna 554-5, and a sixth antenna 554-6. The cellular radio and front end 548-2 may excite those antennas in order to cause the antennas to emit one or a plurality of frequencies based on the target frequency or a plurality of target frequencies for cellular wireless communications. The four antennas 554-3, 554-4, 554-5, and 554-6 may be allocated for different cellular wireless communication frequency bands and/or may provide for MIMO 4×4 cellular capability. As such, these antennas may be operatively coupled to the cellular radio and front end 548-2 within a cellular RF subsystem.

In the example embodiments shown in FIG. 5, these six antennas are utilized to support the three different wireless protocol RF subsystems: a Wi-fi/Bluetooth wireless protocol, a cellular wireless protocol, and an OOB Wi-Fi wireless protocol. Two antennas may be initially allocated to the Wi-Fi and BT radio and front end 548-1 and four antennas are initially allocated to the cellular radio and front end 548-2. During operation of an information handling system 500, the second antenna 554-2 or third antenna 554-3 are shared antennas that may be switched to be operatively coupled to the OOB Wi-Fi radio and front end 548-3 in order to support an OOB communication link to a network to harvest out-of-band (OOB) network channel telemetry data for wireless subsystems 548-1, 548-2, and 548-3 as described herein.

In an embodiment, the information handling system 500 may initiate, via the antenna controller 558, a sideband communication link with the Wi-Fi and BT radio and front end 548-1 and cellular radio and front end 548-2. This sideband communication includes a request from the antenna controller 558 for status information indicating operational status of the OOB Wi-Fi radio and front end 548-3, the cellular radio and front end 548-2, and the Wi-Fi and BT radio and front end 548-1 such as whether these radios and front-ends are idle, connected to a network, or is currently scanning for a wireless network to be communicatively coupled to. The request may also include a request for frequency channel, frequency band, jitter, signal strength telemetry data, and radio mode of operation (e.g., N×N MIMO), as well as other host detectible radio telemetry data as described herein. This sideband communication may include a detection or indication of a provisioning event such as for an eSIM or other wireless network or system provisioning from an information handling system management system. The CPU/Core 590 may require provisioning upon initial setup, or based on scheduled provisioning communication previously established by a remote information handling system management system such as Dell Optimizer® in some example embodiments.

In an embodiment, the system operational context data and radio telemetry data may include wireless application telemetry data descriptive of an application being executed by the CPU 590. The application being executed on the information handling system may include applications that require high bandwidth that is supportable through the use of a 4×4 MIMO connection at the cellular radio and front end 548-2. In this embodiment, the antenna controller 558 may execute the antenna assigning algorithm 560 and use as input the application telemetry data, the system operational context data, the radio telemetry data, among other operating characteristics of the Wi-Fi and BT radio and front end 548-1, OOB Wi-Fi radio and front end 548-3, and cellular radio and front end 548-2 to determine if and which of the second antenna 554-2 or third antenna 554-3 is to be reassigned and operatively coupled to the OOB Wi-Fi radio and front end 548-3. The decision as to which of the second antenna 554-2 and third antenna 554-3 to assign or reassign for use at the OOB Wi-Fi radio and front end 548-3 is dependent on this data and the method of application of that data by the antenna assigning algorithm 560.

When either of the second antenna 554-2 or third antenna 554-3 are assigned to the OOB Wi-Fi radio and front end 548-3 such as with detection of a provisioning event, the antenna controller 558 may access an RF switch 556 and assign either of the second antenna 554-2 or third antenna 554-3 to the OOB Wi-Fi radio and front end 448-3 accordingly. The RF switch 556 may include any type of switch that may assign the second antenna 554-2 to the OOB Wi-Fi radio and front end 548-3 while concurrently maintaining the operatively coupling of the third antenna 554-3 to the cellular radio and front end 548-2. In an alternative embodiment, where the third antenna 554-3 is to be assigned to the OOB Wi-Fi radio and front end 548-3, the antenna controller 558 may access the RF switch 556 to switch the third antenna 554-3 to be operatively coupled to the OOB Wi-Fi radio and front end 548-3 while maintaining the operative coupling of the second antenna 554-2 with the Wi-Fi and BT radio and front end 548-1. Such determinations may be made by the antenna assigning algorithm 560 based on one or more detected radios contexts such as shown by examples in Table 1.

Once the antenna controller 558 has determined to assign one of the third antenna 554-3 and second antenna 554-2 to the OOB Wi-Fi radio and front end 548-3, and has accessed the RF switch 556 to make that assignment, the OOB Wi-Fi radio and front end 548-3 may access, for example, an information handling system management system on a network (e.g., Wi-Fi network or cellular network) to harvest out-of-band (OOB) network channel telemetry data. With the out-of-band (OOB) network channel telemetry data, the antenna controller 558 may execute the antenna controller 558 in a closed loop fashion to determine whether and when to reassign one of the second antenna 554-2 or third antenna 554-3 to be operatively coupled to the OOB Wi-Fi radio and front end 548-3. In this manner, the antenna controller 558 may manage the wireless resources of the information handling system 500 by cross pollinating antennas 554-2 and 554-3 across the cellular radio and front end 548-2, Wi-Fi and BT radio and front end 548-1, and OOB Wi-Fi radio and front end 548-3 depending on detected radio context thereby avoiding the need to add additional antennas within the chassis of the information handling system 500.

The execution of the antenna assigning algorithm 560 by the antenna controller 558 includes the request and receipt of the radio telemetry data and system operational context data from the cellular radio and front end 548-2, Wi-Fi and BT radio and front end 548-1, and OOB Wi-Fi radio and front end 548-3. The antenna controller 558 may then use this data to help reassign or assign the second antenna 554-2 or the third antenna 554-3 (in the context of FIG. 5) to be operatively coupled to the OOB Wi-Fi radio and front end 548-3. A representation of the antenna assigning algorithm 560 may be found in the example Table 1 as described herein.

Again, Table 1 shows a number of contexts where the first antenna 554-1 and second antenna 554-2 may be assigned for use by the OOB Wi-Fi radio and front end 548-3. In an embodiment, the operative coupling of the second antenna 554-2 to the OOB Wi-Fi radio and front end 548-3 may be represented in any of Context #0, Context #1, or Context #2. In each of these contexts, the second antenna 554-2, based on the radio context/antenna management and signaling manager decision, is assigned to the OOB Wi-Fi radio and front end 548-3. In these example embodiments, the second antenna 554-2 has been operatively coupled to the OOB Wi-Fi radio and front end 548-3 as illustrated in FIG. 5. Additionally, the third antenna 554-3 is retained to be operatively coupled to the cellular radio and front end 548-2 and allowed, at least on Context #1 and Context #2 to operate in a 4×4 MIMO configuration using a 5G protocol to communicate with a cellular network.

Again, in an example context shown as context #5 in the first column of Table 1, the OOB Wi-Fi radio and front end 548-3 (e.g., "EC OOB Wi-Fi") is, via sideband communication from the antenna controller 558, identified as being connected to a network via an OOB communication link. The Wi-Fi and BT radio and front end 548-1 (e.g., "Host BT/WLAN") in context #5 shows that the Wi-Fi and BT radio and front end 548-1 is currently connected to a Wi-Fi network using a 2×2 MIMO radio mode using the first antenna 554-1 and second antenna 554-2. In context #5, the cellular radio and front end 548-2 (e.g., "Host WWAN") is shown to be currently scanning and in an idle configuration.

This radio telemetry data obtained from the Wi-Fi and BT radio and front end 548-1, cellular radio and front end 548-2, and OOB Wi-Fi radio and front end 548-3 via the sideband communication may be provided to the antenna controller 558 so that the antenna controller 558 can assign, in this example embodiment, one of the antennas 554-1, 554-2, 554-3, 554-4, 554-5, or 554-6 to be operatively coupled to the OOB Wi-Fi radio and front end 548-3. To do so, the antenna controller 558 may use the radio telemetry data, as input, into the antenna assigning algorithm 560 to direct this reassignment of one of the second antenna 554-2 or third antenna 554-3. In the embodiments described herein, the antenna controller 558 may form part of or be operatively coupled to an antenna management and signaling manager (not shown). This antenna management and signaling manager, in an embodiment, may act as a pass through of the radio telemetry data and status information descriptive of operational status of the wireless protocol subsystems. In an embodiment, the antenna management and signaling manager may also manage the monitoring of the radio telemetry data and status information, manage any eUICC (e.g., embedded subscriber identity module (eSIM)) management, and interface with a SM-DP server to land profiles. In an embodiment, the antenna management and signaling manager may also communicate with the embedded controller 592 to conduct the OOB communication with a network to obtain out-of-band (OOB) network channel telemetry data. In an embodiment, the antenna management and signaling manager may also receive data descriptive of applications being executed by the CPU and core systems 590 from the CPU and core systems 590 in order to determine wireless data bandwidth needs to facilitate the operation of those executed applications. In an embodiment, the antenna management and signaling manager may also, with the antenna controller 558 and embedded controller 592, configure the radio frequencies (RFs) at which any of the antennas 554-1, 554-2, 554-3, 554-4, 554-5, 554-6 operate.

Context #5 in Table 1 also indicates that the antenna management and signaling manager described herein, with the antenna controller 558 and after gathering the radio telemetry data, assigns one of the first antenna 554-1, second antenna 554-2, third antenna 554-3, fourth antenna 554-4, fifth antenna 554-5, and sixth antenna 554-6 to be operatively coupled to the OOB Wi-Fi radio and front end 548-3. As described herein, the execution of the antenna assigning algorithm 560 provides output to the antenna management and signaling manager antenna controller 558 indicating which antenna to operatively couple to the OOB Wi-Fi radio and front end 548-3. In Context #5 of Table 1, the sixth antenna 554-6 originally coupled to the cellular radio and front end 548-2 is operatively coupled to the OOB Wi-Fi radio and front end 548-3 via actuation of the RF switch 556. In order to operatively switch the sixth antenna 554-6 to an antenna port at the OOB Wi-Fi radio and front end 548-3 from the antenna port of the cellular radio and front end 548-2, the antenna controller 558 may signal to the RF switch 556. This signal causes the lead from the cellular radio and front end 548-2 to the sixth antenna 554-6 to be disconnected and connected to the OOB Wi-Fi radio and front end 548-3. In an embodiment, the operation of the RF switch 556 causes the remaining antennas 554-1, 554-2, 554-3, 554-5, and 554-6 to be operatively coupled to the either of the Wi-Fi radio and front end 548-1 or cellular radio and front end 548-2. In this embodiment, the RF switch 556 may include a single pole, sextuple throw switch such that the OOB Wi-Fi radio and front end 548-3 is coupled to any of the available antennas 554-1, 554-2, 554-3, 554-4, 554-5, and 554-6 based on the telemetry data. The present specification contemplates, however, that the RF switch 556 may be any type or numbers of switches that allows the OOB Wi-Fi radio and front end 548-3 to be operatively coupled to any of one or more shared antennas in order to harvest the out-of-band (OOB) network channel telemetry data.

Table 1, due to the input context data represented by the "Radio Context/Antenna Management and Signaling Manager Decision" heading, provides a mapping of each of the six antennas 554-1, 554-2, 554-3, 554-4, 554-5, 554-6 to each of the OOB Wi-Fi radio and front end 548-3, the cellular radio and front end 548-2, and the Wi-Fi and BT radio and front end 548-1 in an example embodiment. Under the header "Antenna Management and Signaling Manager Dynamic Antenna Paring Logic Table," Table 1 provides example output from the antenna controller 558 executing the antenna assigning algorithm 560 as described herein based on detected contexts as received from plural inputs of the information handling system or OOB communications with a management system and the antenna controller 558 in some embodiments. In Context #5, therefore, the OOB Wi-Fi radio and front end 548-3 (e.g., "EC OOB Wi-Fi") is assigned the sixth antenna 554-6 (e.g., "Cellular Ant 6"). As described herein, the execution of the antenna assigning algorithm 560 may mandate that the OOB Wi-Fi radio and front end 548-3 be operatively coupled to an antenna 554-1, 554-2, 554-3, 554-4, 554-5, 554-6 so that at any given time, the OOB Wi-Fi radio and front end 548-3 may be operatively coupled to a network to harvest OOB network channel telemetry data according to the instructions of the embedded controller 592. Context #5 further shows as output that a first port of the Wi-Fi and BT radio and front end 548-1 (e.g., "Host BT/Wi-Fi Ant 1") is assigned the first antenna 554-1. Further, the second port of the Wi-Fi and BT radio and front end 548-1 (e.g., "Host Wi-Fi Ant 2") is indicated as being operatively coupled to a second antenna 554-2. With reference to FIG. 5, this is indicated by the RF switch 556 completing the circuit between the second port of the Wi-Fi and BT radio and front end 548-1 to the second antenna 554-2 (dashed lines). As output in Context #5, the third antenna 554-3 is operatively coupled to the cellular radio and front end 548-2 and is transceiving. The fourth antenna 554-4 may be unused in this embodiment along with the fifth antenna 554-5. The antenna controller 558, in context #5 may remove the connect between the sixth antenna 554-6 and the cellular radio and front end 548-2 (e.g., "Cellular Ant 3") and repurposes the sixth antenna 554-6 to be operatively coupled to the OOB Wi-Fi radio and front end 548-3 (e.g., "Repurposed to EC OOB Wi-Fi" scenario #5, column 5). Again, the RF switch 556, being controlled by the antenna controller 558 makes this connection.

Figure 6:
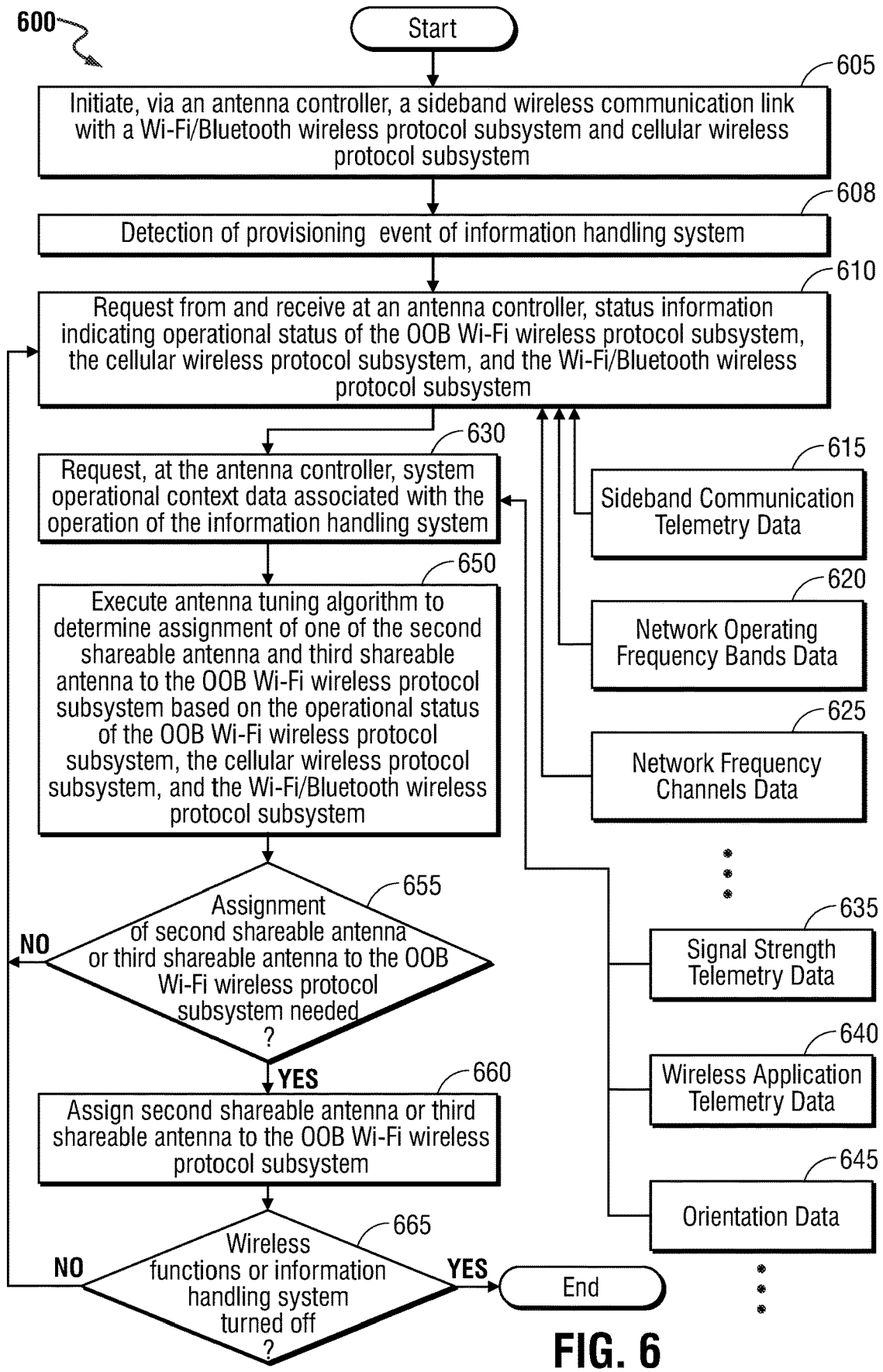
FIG. 6 is a flow diagram illustrating a method for operating an information handling system and antenna controller according to an embodiment of the present disclosure.

FIG. 6 is a flow diagram illustrating a method 600 for operating an information handling system and antenna controller according to an embodiment of the present disclosure. The method 600 may include, at block 605, with initiating, via an antenna controller, a sideband wireless communication link with a Wi-Fi/Bluetooth wireless subsystem and cellular wireless protocol subsystem. This may be done to discover radio telemetry data descriptive of the current connection state (e.g., idle, connected, scanning, etc.) of the radios and front ends described herein and present in the information handling system.

In an embodiment, the method 600 may include the detection of a provisioning event of the information handling system at block 608. In an embodiment, the detection or indication of a provisioning event may come from an eSIM or other wireless network or system provisioning from an information handling system management system. The CPU/Core, in an embodiment, may require provisioning upon initial setup or the provisioning event may be based on a scheduled provisioning communication previously established by a remote information handling system management system such as Dell Optimizer® in some example embodiments. In an embodiment, the information handling system may include its own provisioning schedule that initiates a provisioning event. This provisioning event causes the embedded controller of the information handling system to proceed with the next processes of the method 600 described including initiating an OOB communication with a network.

In an embodiment, at block 610, the radio telemetry data may include frequency channels being used to communicate with a network, frequency bands used to communicate with the networks, jitter, signal strength, and radio mode of operation (e.g., N×N MIMO), as well as other host detectible radio telemetry data as indicated at blocks 615 with sideband communication telemetry data, 620 with network operating frequency bands data, and 625 network frequency channels data. At block 610, the antenna controller, after establishing the sideband communication, may request and receive status information indicating operational status of the OOB Wi-Fi wireless protocol subsystem, the cellular wireless protocol subsystem, and the Wi-Fi/Bluetooth wireless protocol subsystem with this type of radio telemetry data being included in that data.

In an embodiment, the method 600 may also request additional data that includes system operational context data associated with the operation of the information handling system. In this embodiment, an antenna management and signaling manager may gather signal strength telemetry data 640, wireless application telemetry data 640, and orientation data 645. The signal strength telemetry data 640 may be data that describes received signal strength indicator (RSSI) data and specific absorption rate (SAR) data that describes how any currently date transceiving antennas are sending and receiving data.

The application telemetry data 640 may be data describing software applications operating on the information handling system. The application being executed on the information handling system may include applications that require high bandwidth that is supportable through the use of a 4×4 MIMO connection at the cellular radio and front end. In this embodiment, the antenna controller may execute the antenna assigning algorithm and use as input the application telemetry data, the system operational context data, the radio telemetry data, among other operating characteristics of the Wi-Fi and BT radio and front end, OOB Wi-Fi radio and front end, and cellular radio and front end to determine which antenna is to be reassigned and operatively coupled to the OOB Wi-Fi radio and front end.

The orientation data 645 may be data that describes a current orientation of the information handling system such as a tablet configuration, a dual tablet configuration, a laptop configuration, a tent mode configuration, a book configuration, among others. The orientation of the information handling system may include the antennas formed into a display chassis or a base chassis of the information handling system. As the information handling system is placed in any one of these orientations, the antennas may or may not be in a physical location that allows the signals to and from the antenna to transmit data. This may affect the ability of any given antenna to function at all and this data may be provided to the antenna controller as described.

The method 600 may continue at block 650 with executing the antenna tuning algorithm to determine assignment of a first antenna (e.g., one of the second shareable antenna and third shareable antenna as shown in FIGS. 4 and 5) to the OOB Wi-Fi wireless protocol subsystem based on the operational status of the OOB Wi-Fi wireless protocol subsystem, the cellular wireless protocol subsystem, and the Wi-Fi/Bluetooth wireless protocol subsystem. As described herein, the antenna controller executes an antenna assigning algorithm in order to determine how to reassign any one of the antennas to a OOB Wi-Fi radio and front end.

As indicated in Table 1, representative input into the antenna assigning algorithm and output from the execution of that antenna assigning algorithm are shown. In the context of the example contexts provided there, the input may include the radio telemetry data descriptive of the current connection state (e.g., idle, connected, scanning, etc.) of the radios and front ends described herein such as the Wi-Fi and BT radio and front end, the cellular radio and front end, and the OOB Wi-Fi radio and front end. It is appreciated that the information handling system may include more than a single cellular radio and front end and a single Wi-Fi and BT radio and front end as illustrated in FIGS. 4 and 5.

The method 600 may continue with determining whether assignment of a first antenna (e.g., one of the second shareable antenna and third shareable antenna as shown in FIGS. 4 and 5) to the OOB Wi-Fi wireless protocol subsystem needed. As described herein, the antenna may be a shareable antenna shared to the OOB Wi-Fi radio and front end from one of a Wi-Fi and BT radio and front end or a cellular radio and front end. Continuing with the examples shown in FIGS. 4 and 5, one of two of the antennas associated with the Wi-Fi and BT radio and front end and one of four of the antennas associated with the cellular radio and front end may be a shared antenna that is dynamically switchable to be operatively coupled to the OOB Wi-Fi radio and front end. Where the execution of the antenna assigning algorithm at block 650 indicates at block 655 that, for example, an antenna (e.g., a second sharable antenna FIGS. 4 and 5) is to be operatively coupled to the OOB Wi-Fi radio and front end, the method 900 may continue at block 660. At block 660, the antenna controller may assign the antenna to the OOB Wi-Fi radio and front end such that the OOB Wi-Fi radio and front end uses that antenna to conduct an OOB communication with a network to obtain OOB network channel telemetry data.

In an embodiment, where the execution of the antenna assigning algorithm does not indicate that the first antenna (e.g., a second antenna or third antenna in FIGS. 4 and 5) should be reassigned to the OOB Wi-Fi radio and front end, the method 600 may continue back at block 610 with gathering the radio telemetry data and system operational context data as described.

However, where an antenna has been assigned to be used by the OOB Wi-Fi radio and front end at block 660, the method may continue with determining whether the wireless functions or the information handling system itself has been turned off. Where the wireless functions are continuing to be operated, the method 600 may continue at block 610 with dynamically, in an open loop fashion gathering the radio telemetry data and system operational context data as described. Here, the assignment of any given antenna to be operatively coupled to the OOB Wi-Fi radio and front end may be changed based on any changing radio telemetry data and system operational context data. Where either the wireless functions or the information handling system itself have been turned off at block 665, the method may end.

The blocks of flow diagram of FIG. 6 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system to wirelessly transmit and receive data comprising:
    a processor;
    a memory;
    a power management unit;
    a wireless interface adapter for transceiving wireless communications via radiofrequency (RF) waves having a first wireless protocol subsystem and a second wireless protocol subsystem;
    a plurality of antennas operatively coupled to the wireless interface adapter, including at least a first antenna operatively coupled to the first wireless protocol subsystem and at least a second antenna operatively coupled to the second wireless protocol subsystem;
    a third wireless protocol subsystem operated by an embedded controller and operatively couplable to one of the first antenna and second antenna via an RF switch to initiate an out-of-band (OOB) communication with a network by operatively switching one of the first antenna and second antenna to be operatively coupled to the third wireless protocol subsystem; and
    an antenna controller operatively coupled to the RF switch configured to:
        receive radio telemetry data indicating radio connection status information of the first wireless protocol subsystem, the second wireless protocol subsystem, and the third wireless protocol subsystem;
        determine assignment, in a closed loop fashion via execution of an antenna assignment algorithm, of one of the first antenna and second antenna to be a shared antenna and switched to the third wireless protocol subsystem based on the operational status of the first wireless protocol subsystem, second wireless protocol subsystem, and third wireless protocol subsystem; and
        send a command to switch the RF switch to operatively couple one of the first antenna and second antenna to the third wireless protocol subsystem.

2. The information handling system of claim 1, wherein switching one of the first antenna and second antenna to be operably coupled to the third wireless protocol subsystem provides for a bandwidth change for the wireless communications via one of the first wireless protocol subsystem and second wireless protocol subsystem.

3. The information handling system of claim 1, wherein the second wireless protocol subsystem is operatively coupled to the second antenna, a third antenna, a fourth antenna, and a fifth antenna to provide wireless communication via the second wireless protocol subsystem.

4. The information handling system of claim 1, wherein the first wireless protocol subsystem is operatively coupled to the first antenna and a sixth antenna to provide wireless communication via the first wireless protocol subsystem.

5. An information handling system of claim 1 further comprising:
    the antenna controller operatively coupled to the RF switch configured to send a command to switch the RF switch to operatively couple the first antenna to the third wireless protocol subsystem when the first wireless protocol subsystem determined to be idle.

6. The information handling system of claim 1, further comprising:
    the antenna controller operatively coupled to the RF switch configured to send a command to switch the RF switch to operatively couple the second antenna to the third wireless protocol subsystem when the second antenna second wireless protocol subsystem is determined to be idle.

7. The information handling system of claim 1, further comprising:
    the antenna controller to detect a provisioning event and instruct the third wireless protocol subsystem to initiate the OOB communication with a network.

8. An information handling system to wirelessly transmit and receive data comprising:
    a processor and a memory in a base chassis;
    a power management unit;
    a wireless interface adapter for transceiving wireless communications via radiofrequency (RF) waves having a first wireless protocol subsystem, a second wireless protocol subsystem, and a third wireless protocol subsystem;
    a plurality of antennas operatively coupled to the wireless interface adapter, including:
        at least a first shareable antenna operatively coupled to a radio frequency (RF) switch to switch the first shareable antenna between the first wireless protocol subsystem and the third wireless protocol subsystem; and
        a second shareable antenna operatively coupled to the RF switch to switch the second shareable antenna between the second wireless protocol subsystem and the third wireless protocol subsystem;
    an antenna controller operatively coupled to the RF switch configured to:
        receive radio telemetry data indicating radio connection status information of the first wireless protocol subsystem, the second wireless protocol subsystem, and the third wireless protocol subsystem;

determine assignment of one of the first shareable antenna and second shareable antenna to the third wireless protocol subsystem based on the operational status of the first wireless protocol subsystem, the second wireless protocol subsystem, and the third wireless protocol subsystem; and send commands to switch the RF switch to operatively couple the first shareable antenna and second shareable antenna to the third wireless protocol subsystem to harvest out-of-band (OOB) network channel telemetry data.

9. The information handling system of claim 8 further comprising:

the antenna controller to dynamically switch first shareable antenna or second shareable antenna to the third wireless protocol subsystem based on detection of radio contexts of the information handling system and available wireless networks.

10. The information handling system of claim 8 further comprising:

the antenna controller to dynamically switch first shareable antenna or second shareable antenna to the third wireless protocol subsystem based on:
detection of radio contexts of the information handling system and available wireless networks; and
detection of a provisioning event for an embedded controller of the information handling system via the third wireless protocol subsystem.

11. The information handling system of claim 8, wherein the switchable first shareable antenna and second shareable antenna are configured to provide expanded bandwidth for the wireless communications via the first wireless protocol subsystem or second wireless protocol subsystem.

12. The information handling system of claim 8, wherein the third wireless protocol subsystem is operatively coupled to the first shareable antenna and the second wireless protocol subsystem is operatively coupled to the second shareable antenna and the first wireless protocol subsystem provides wireless communications at a reduced bandwidth while wireless communication via the second wireless protocol subsystem remains available at an increased bandwidth during operation of the third wireless protocol subsystem on an OOB network channel.

13. The information handling system of claim 8, wherein the third wireless protocol subsystem is operatively coupled to the second shareable antenna and the first wireless protocol subsystem is operatively coupled to the first shareable antenna and the second wireless protocol subsystem provides wireless communications at a reduced bandwidth and provide wireless communication via the first wireless protocol subsystem remains available at an increased bandwidth during operation of the third wireless protocol subsystem on an OOB network channel.

14. The information handling system of claim 8, wherein the second wireless protocol subsystem communicates via a four antenna multiple input and multiple output (MIMO) multipath wireless link communication including the second shareable antenna with a second wireless protocol network when the first shareable antenna is operatively coupled to the third wireless protocol subsystem.

15. An information handling system to wirelessly transmit and receive data comprising:

a processor, a memory and a power management unit (PMU) formed in a base chassis;

a display device in a display chassis hinged to the base chassis;

a wireless interface adapter for transceiving wireless communications via radiofrequency (RF) waves having a Wi-Fi/Bluetooth wireless protocol subsystem, a cellular wireless protocol subsystem, and an out-of-band (OOB) Wi-Fi wireless protocol subsystem operatively controlled by an embedded controller;

a plurality of antennas operatively coupled to the wireless interface adapter, including:
at least a first antenna operatively coupled to the Wi-Fi protocol subsystem and a second shareable antenna operatively coupled to an RF switch to dynamically switch the second shareable antenna between one of the Wi-Fi/Bluetooth wireless protocol subsystem and the OOB Wi-Fi wireless protocol subsystem;
at least a fourth antenna, a fifth antenna, and a sixth antenna operatively coupled to the cellular wireless protocol subsystem and a third shareable antenna coupled to the RF switch to dynamically switch the third shareable antenna between one of the cellular wireless protocol subsystem and the OOB Wi-Fi wireless protocol subsystem;

an antenna controller operatively coupled to the RF switch configured to:
receive radio telemetry data indicating radio connection status information of the OOB Wi-Fi wireless protocol subsystem, the cellular wireless protocol subsystem, and the Wi-Fi/Bluetooth wireless protocol subsystem;
determine assignment of one of the second shareable antenna and third shareable antenna to the OOB Wi-Fi wireless protocol subsystem based on the operational status of the OOB Wi-Fi wireless protocol subsystem, the cellular wireless protocol subsystem, and the Wi-Fi/Bluetooth wireless protocol subsystem upon detection of a provisioning event; and
send commands to switch the RF switch to operatively couple the second shareable antenna and third shareable antenna to the OOB Wi-Fi wireless protocol subsystem to harvest OOB network channel telemetry data.

16. The information handling system of claim 15, wherein switching one of the second shareable antenna and third shareable antenna to be operably coupled to the OOB Wi-Fi wireless protocol subsystem provides for a bandwidth change for the wireless communications via one of the cellular wireless protocol subsystem or Wi-Fi/Bluetooth wireless protocol subsystem depending which of the second or third shareable antenna is selected for OOB Wi-Fi wireless communications based on a detected radio context for the information handling system.

17. The information handling system of claim 15, wherein the cellular wireless protocol subsystem is operatively coupled to the third shareable antenna and the OOB Wi-Fi wireless protocol subsystem is operatively coupled to the second shareable antenna to provide wireless communication via the cellular wireless protocol subsystem at an increased bandwidth and provide wireless communication via the Wi-Fi/Bluetooth wireless protocol subsystem at a decreased bandwidth while the OOB Wi-Fi wireless protocol subsystem operates on an harvest OOB network channel.

18. The information handling system of claim 15, wherein the OOB Wi-Fi wireless protocol subsystem is operatively coupled to the third shareable antenna and the Wi-Fi/Bluetooth wireless protocol subsystem is operatively coupled to the second shareable antenna to provide wireless communication via the cellular wireless protocol subsystem at a reduced bandwidth and provide wireless communication via the Wi-Fi/Bluetooth wireless protocol subsystem at an increased bandwidth while the OOB Wi-Fi wireless protocol subsystem is operating on an OOB network channel.

19. An information handling system of claim 15, wherein the RF switch excludes the assignment of both the second sharable antenna and third sharable antenna to the OOB Wi-Fi wireless protocol subsystem concurrently.

20. The information handling system of claim 15, wherein the cellular wireless protocol subsystem communicates via a four antenna multiple input and multiple output (MIMO) multipath wireless link communication including the third shareable antenna with a cellular wireless protocol network when the second shareable antenna is operatively coupled to the OOB Wi-Fi wireless protocol subsystem.

* * * * *